(12) United States Patent
Low et al.

(10) Patent No.: US 8,359,643 B2
(45) Date of Patent: Jan. 22, 2013

(54) GROUP FORMATION USING ANONYMOUS BROADCAST INFORMATION

(75) Inventors: Daryl Mun-Kid Low, Cupertino, CA (US); Ronald Keryuan Huang, Milpitas, CA (US); Puneet Mishra, Santa Clara, CA (US); Gaurav Jain, Sunnyvale, CA (US); Jason Gosnell, San Francisco, CA (US); Jeff Bush, San Jose, CA (US)

(73) Assignee: Apple Inc., Cupertino, CA (US)

( * ) Notice: Subject to any disclaimer, the term of this patent is extended or adjusted under 35 U.S.C. 154(b) by 361 days.

(21) Appl. No.: 12/233,358

(22) Filed: Sep. 18, 2008

(65) Prior Publication Data

US 2010/0070758 A1 Mar. 18, 2010

(51) Int. Cl.
*H04L 29/06* (2006.01)
(52) U.S. Cl. ............ 726/9; 370/328; 370/315; 370/254; 370/389; 455/456.3; 455/525; 713/155
(58) Field of Classification Search .................. 370/328, 370/315, 254, 389; 455/456.3, 525; 726/9; 713/155; 705/1

See application file for complete search history.

(56) References Cited

U.S. PATENT DOCUMENTS

| | | |
|---|---|---|
| 4,644,351 A | 2/1987 | Zabarsky et al. |
| 4,903,212 A | 2/1990 | Yokouchi et al. |
| 4,907,159 A | 3/1990 | Mauge et al. |
| 4,999,783 A | 3/1991 | Tenmoku et al. |
| 5,031,104 A | 7/1991 | Ikeda et al. |
| 5,046,011 A | 9/1991 | Kakihara et al. |
| 5,067,081 A | 11/1991 | Person |
| 5,126,941 A | 6/1992 | Gurmu et al. |
| 5,164,904 A | 11/1992 | Sumner |
| 5,170,165 A | 12/1992 | Iihoshi et al. |
| 5,173,691 A | 12/1992 | Sumner |
| 5,182,555 A | 1/1993 | Sumner |

(Continued)

FOREIGN PATENT DOCUMENTS

BR 9904979 12/2000

(Continued)

OTHER PUBLICATIONS

Feddema et al., "Cooperative Sentry Vehicles and Differential GPS Leapfrog," 2000, United States Department of Energy, pp. 1-12.

(Continued)

*Primary Examiner* — Brandon Hoffman
*Assistant Examiner* — Hee Song
(74) *Attorney, Agent, or Firm* — Fish & Richardson P.C.

(57) ABSTRACT

A number of devices co-located at a geographic location can broadcast and receive tokens. Tokens can be exchanged using a communication link having limited communication range. Tokens that are received by a device can be stored locally on the device and/or transmitted to a trusted service operating remotely on a network. In some implementations, the tokens can be stored with corresponding timestamps to assist a trusted service in matching or otherwise correlating the tokens with other tokens provided by other devices. The trusted service can perform an analysis on the tokens and timestamps to identify devices that were co-located at the geographic location at or around a contact time which can be defined by the timestamps. A group can be created based on results of the analysis. Users can be identified as members of the group and invited to join the group.

23 Claims, 9 Drawing Sheets

U.S. PATENT DOCUMENTS

| | | |
|---|---|---|
| 5,187,810 A | 2/1993 | Toneyama et al. |
| 5,195,031 A | 3/1993 | Ordish |
| 5,208,763 A | 5/1993 | Hong et al. |
| 5,218,629 A | 6/1993 | Dumond, Jr. et al. |
| 5,243,652 A | 9/1993 | Teare |
| 5,274,560 A | 12/1993 | LaRue |
| 5,289,572 A | 2/1994 | Yano et al. |
| 5,295,064 A | 3/1994 | Malec et al. |
| 5,307,278 A | 4/1994 | Hermans et al. |
| 5,317,311 A | 5/1994 | Martell et al. |
| 5,337,044 A | 8/1994 | Folger et al. |
| 5,339,391 A | 8/1994 | Wroblewski et al. |
| 5,371,678 A | 12/1994 | Nomura |
| 5,374,933 A | 12/1994 | Kao |
| 5,379,057 A | 1/1995 | Clough et al. |
| 5,390,125 A | 2/1995 | Sennott et al. |
| 5,406,490 A | 4/1995 | Braegas |
| 5,416,712 A | 5/1995 | Geier et al. |
| 5,416,890 A | 5/1995 | Beretta |
| 5,469,362 A | 11/1995 | Hunt et al. |
| 5,479,600 A | 12/1995 | Wroblewski et al. |
| 5,504,482 A | 4/1996 | Schreder |
| 5,508,707 A | 4/1996 | LeBlanc et al. |
| 5,510,801 A | 4/1996 | Engelbrecht et al. |
| 5,519,760 A | 5/1996 | Borkowski et al. |
| 5,523,950 A | 6/1996 | Peterson |
| 5,537,460 A | 7/1996 | Holliday, Jr. et al. |
| 5,539,395 A | 7/1996 | Buss |
| 5,539,647 A | 7/1996 | Shibata et al. |
| 5,552,989 A | 9/1996 | Bertrand |
| 5,559,520 A | 9/1996 | Barzegar et al. |
| 5,570,412 A | 10/1996 | LeBlanc |
| 5,598,572 A | 1/1997 | Tanikoshi et al. |
| 5,627,547 A | 5/1997 | Ramaswamy et al. |
| 5,627,549 A | 5/1997 | Park |
| 5,628,050 A | 5/1997 | McGraw |
| 5,630,206 A | 5/1997 | Urban et al. |
| 5,636,245 A | 6/1997 | Ernst |
| 5,642,303 A | 6/1997 | Small |
| 5,646,853 A | 7/1997 | Takahashi et al. |
| 5,654,908 A | 8/1997 | Yokoyama |
| 5,663,732 A | 9/1997 | Stangeland et al. |
| 5,675,362 A | 10/1997 | Clough et al. |
| 5,675,573 A | 10/1997 | Karol et al. |
| 5,677,837 A | 10/1997 | Reynolds |
| 5,684,859 A | 11/1997 | Chanroo et al. |
| 5,689,252 A | 11/1997 | Ayanoglu et al. |
| 5,689,270 A | 11/1997 | Kelley et al. |
| 5,689,431 A | 11/1997 | Rudow et al. |
| 5,708,478 A | 1/1998 | Tognazzini |
| 5,717,392 A | 2/1998 | Eldridge |
| 5,732,074 A | 3/1998 | Spaur et al. |
| 5,742,666 A | 4/1998 | Alpert |
| 5,745,865 A | 4/1998 | Rostoker et al. |
| 5,748,109 A | 5/1998 | Kosaka et al. |
| 5,752,186 A | 5/1998 | Malackowski et al. |
| 5,754,430 A | 5/1998 | Sawada |
| 5,758,049 A | 5/1998 | Johnson et al. |
| 5,760,773 A | 6/1998 | Berman et al. |
| 5,767,795 A | 6/1998 | Schaphorst |
| 5,774,824 A | 6/1998 | Streit et al. |
| 5,774,829 A | 6/1998 | Cisneros et al. |
| 5,793,630 A | 8/1998 | Theimer |
| 5,796,365 A | 8/1998 | Lewis et al. |
| 5,796,613 A | 8/1998 | Kato et al. |
| 5,806,018 A | 9/1998 | Smith et al. |
| 5,825,306 A | 10/1998 | Hiyokawa et al. |
| 5,825,884 A | 10/1998 | Zdepski et al. |
| 5,831,552 A | 11/1998 | Sogawa et al. |
| 5,835,061 A | 11/1998 | Stewart |
| 5,839,086 A | 11/1998 | Hirano |
| 5,845,227 A | 12/1998 | Peterson |
| 5,848,373 A | 12/1998 | DeLorme et al. |
| 5,862,244 A | 1/1999 | Kleiner et al. |
| 5,867,110 A | 2/1999 | Naito et al. |
| 5,870,686 A | 2/1999 | Monson |
| 5,872,526 A | 2/1999 | Tognazzini |
| 5,873,068 A | 2/1999 | Beaumont et al. |
| 5,883,580 A | 3/1999 | Briancon |
| 5,887,269 A | 3/1999 | Brunts et al. |
| 5,892,454 A | 4/1999 | Schipper et al. |
| 5,893,898 A | 4/1999 | Tanimoto |
| 5,898,680 A | 4/1999 | Johnstone |
| 5,899,954 A | 5/1999 | Sato |
| 5,905,451 A | 5/1999 | Sakashita |
| 5,908,465 A | 6/1999 | Ito et al. |
| 5,910,799 A | 6/1999 | Carpenter |
| 5,923,861 A | 7/1999 | Bertram et al. |
| 5,933,094 A | 8/1999 | Goss et al. |
| 5,933,100 A | 8/1999 | Golding |
| 5,936,572 A | 8/1999 | Loomis et al. |
| 5,938,721 A | 8/1999 | Dussell et al. |
| 5,941,930 A | 8/1999 | Morimoto et al. |
| 5,941,934 A | 8/1999 | Sato |
| 5,946,618 A | 8/1999 | Agre et al. |
| 5,948,040 A | 9/1999 | DeLorme et al. |
| 5,948,041 A | 9/1999 | Abo et al. |
| 5,948,061 A | 9/1999 | Merriman et al. |
| 5,955,973 A | 9/1999 | Anderson |
| 5,959,577 A | 9/1999 | Fan |
| 5,959,580 A | 9/1999 | Maloney et al. |
| 5,968,109 A | 10/1999 | Israni et al. |
| 5,969,678 A | 10/1999 | Stewart |
| 5,982,298 A | 11/1999 | Lappenbusch et al. |
| 5,982,324 A | 11/1999 | Watters et al. |
| 5,987,381 A | 11/1999 | Oshizawa |
| 5,991,692 A | 11/1999 | Spencer, II et al. |
| 5,999,126 A | 12/1999 | Ito |
| 6,002,932 A | 12/1999 | Kingdon et al. |
| 6,002,936 A | 12/1999 | Roel-Ng et al. |
| 6,005,928 A | 12/1999 | Johnson |
| 6,014,090 A | 1/2000 | Rosen et al. |
| 6,014,607 A | 1/2000 | Yagyu et al. |
| 6,023,653 A | 2/2000 | Ichimura et al. |
| 6,026,375 A | 2/2000 | Hall et al. |
| 6,028,550 A | 2/2000 | Froeberg et al. |
| 6,029,069 A | 2/2000 | Takaki |
| 6,031,490 A | 2/2000 | Forssen et al. |
| 6,041,280 A | 3/2000 | Kohli et al. |
| 6,052,645 A | 4/2000 | Harada |
| 6,058,350 A | 5/2000 | Ihara |
| 6,064,335 A | 5/2000 | Eschenbach |
| 6,067,502 A | 5/2000 | Hayashida et al. |
| 6,069,570 A | 5/2000 | Herring |
| 6,073,013 A | 6/2000 | Agre et al. |
| 6,073,062 A | 6/2000 | Hoshino et al. |
| 6,076,041 A | 6/2000 | Watanabe |
| 6,078,818 A | 6/2000 | Kingdon et al. |
| 6,081,206 A | 6/2000 | Kielland |
| 6,085,090 A | 7/2000 | Yee et al. |
| 6,085,148 A | 7/2000 | Jamison |
| 6,087,965 A | 7/2000 | Murphy |
| 6,088,594 A | 7/2000 | Kingdon et al. |
| 6,091,956 A | 7/2000 | Hollenberg |
| 6,091,957 A | 7/2000 | Larkins |
| 6,092,076 A | 7/2000 | McDonough et al. |
| 6,094,607 A | 7/2000 | Diesel |
| 6,101,443 A | 8/2000 | Kato |
| 6,104,931 A | 8/2000 | Havinis et al. |
| 6,108,555 A | 8/2000 | Maloney et al. |
| 6,111,541 A | 8/2000 | Karmel |
| 6,115,611 A | 9/2000 | Kimoto et al. |
| 6,115,754 A | 9/2000 | Landgren |
| 6,119,014 A | 9/2000 | Alperovich et al. |
| 6,122,520 A | 9/2000 | Want et al. |
| 6,125,279 A | 9/2000 | Hyziak et al. |
| 6,127,945 A | 10/2000 | Mura-Smith |
| 6,128,482 A | 10/2000 | Nixon et al. |
| 6,128,571 A | 10/2000 | Ito et al. |
| 6,134,548 A | 10/2000 | Gottsman et al. |
| 6,138,003 A | 10/2000 | Kingdon et al. |
| 6,138,142 A | 10/2000 | Linsk |
| 6,140,957 A | 10/2000 | Wilson et al. |
| 6,151,309 A | 11/2000 | Busuioc et al. |
| 6,151,498 A | 11/2000 | Roel-Ng et al. |
| 6,154,152 A | 11/2000 | Ito |
| 6,157,381 A | 12/2000 | Bates et al. |

| | | |
|---|---|---|
| 6,157,841 A | 12/2000 | Bolduc et al. |
| 6,163,749 A | 12/2000 | McDonough et al. |
| 6,166,627 A | 12/2000 | Reeley |
| 6,167,266 A | 12/2000 | Havinis et al. |
| 6,169,552 B1 | 1/2001 | Endo et al. |
| 6,175,740 B1 | 1/2001 | Souissi et al. |
| 6,177,905 B1 | 1/2001 | Welch |
| 6,177,938 B1 | 1/2001 | Gould |
| 6,181,934 B1 | 1/2001 | Havinis et al. |
| 6,185,427 B1 | 2/2001 | Krasner et al. |
| 6,188,959 B1 | 2/2001 | Schupfner |
| 6,195,557 B1 | 2/2001 | Havinis et al. |
| 6,195,609 B1 | 2/2001 | Pilley et al. |
| 6,199,014 B1 | 3/2001 | Walker |
| 6,199,045 B1 | 3/2001 | Giniger et al. |
| 6,199,099 B1 | 3/2001 | Gershman et al. |
| 6,202,008 B1 | 3/2001 | Beckert et al. |
| 6,202,023 B1 | 3/2001 | Hancock et al. |
| 6,208,866 B1 | 3/2001 | Rouhollahzadeh et al. |
| 6,212,473 B1 | 4/2001 | Stefan et al. |
| 6,216,086 B1 | 4/2001 | Seymour et al. |
| 6,222,483 B1 | 4/2001 | Twitchell et al. |
| 6,233,518 B1 | 5/2001 | Lee |
| 6,236,365 B1 | 5/2001 | LeBlanc et al. |
| 6,236,933 B1 | 5/2001 | Lang |
| 6,246,948 B1 | 6/2001 | Thakker |
| 6,249,252 B1 | 6/2001 | Dupray |
| 6,252,543 B1 | 6/2001 | Camp |
| 6,252,544 B1 | 6/2001 | Hoffberg |
| 6,256,498 B1 | 7/2001 | Ludwig |
| 6,259,405 B1 | 7/2001 | Stewart et al. |
| 6,266,612 B1 | 7/2001 | Dussell et al. |
| 6,266,614 B1 | 7/2001 | Alumbaugh |
| 6,266,615 B1 | 7/2001 | Jin |
| 6,272,342 B1 | 8/2001 | Havinis et al. |
| 6,278,884 B1 | 8/2001 | Kim |
| 6,281,807 B1 | 8/2001 | Kynast et al. |
| 6,282,491 B1 | 8/2001 | Bochmann et al. |
| 6,282,496 B1 | 8/2001 | Chowdhary |
| 6,295,454 B1 | 9/2001 | Havinis et al. |
| 6,298,306 B1 | 10/2001 | Suarez et al. |
| 6,304,758 B1 | 10/2001 | Iierbig et al. |
| 6,313,761 B1 | 11/2001 | Shinada |
| 6,314,369 B1 | 11/2001 | Ito et al. |
| 6,314,406 B1 | 11/2001 | O'Hagan et al. |
| 6,317,684 B1 | 11/2001 | Roeseler et al. |
| 6,321,158 B1 | 11/2001 | DeLorme et al. |
| 6,323,846 B1 | 11/2001 | Westerman et al. |
| 6,324,692 B1 | 11/2001 | Fiske |
| 6,326,918 B1 | 12/2001 | Stewart |
| 6,332,127 B1 | 12/2001 | Bandera et al. |
| 6,339,437 B1 | 1/2002 | Nielsen |
| 6,339,746 B1 | 1/2002 | Sugiyama et al. |
| 6,343,317 B1 | 1/2002 | Glorikian |
| 6,345,288 B1 | 2/2002 | Reed et al. |
| 6,351,235 B1 | 2/2002 | Stilp |
| 6,353,398 B1 | 3/2002 | Amin et al. |
| 6,353,743 B1 | 3/2002 | Karmel |
| 6,353,837 B1 | 3/2002 | Blumenau |
| 6,356,761 B1 | 3/2002 | Huttunen |
| 6,356,763 B1 | 3/2002 | Kangas et al. |
| 6,356,836 B1 | 3/2002 | Adolph |
| 6,356,838 B1 | 3/2002 | Paul |
| 6,370,629 B1 | 4/2002 | Hastings et al. |
| 6,377,886 B1 | 4/2002 | Gotou |
| 6,381,465 B1 | 4/2002 | Chern et al. |
| 6,381,539 B1 | 4/2002 | Shimazu |
| 6,381,603 B1 | 4/2002 | Chan et al. |
| 6,385,458 B1 | 5/2002 | Papadimitriou et al. |
| 6,385,465 B1 | 5/2002 | Yoshioka |
| 6,385,535 B2 | 5/2002 | Ohishi et al. |
| 6,389,288 B1 | 5/2002 | Kuwahara et al. |
| 6,401,032 B1 | 6/2002 | Jamison |
| 6,405,034 B1 | 6/2002 | Tijerino |
| 6,405,123 B1 | 6/2002 | Rennar et al. |
| 6,411,899 B2 | 6/2002 | Dussell et al. |
| 6,414,635 B1 | 7/2002 | Stewart et al. |
| 6,415,207 B1 | 7/2002 | Jones |
| 6,415,220 B1 | 7/2002 | Kovacs |
| 6,415,227 B1 | 7/2002 | Lin |
| 6,427,115 B1 | 7/2002 | Sekiyama |
| 6,430,411 B1 | 8/2002 | Lempio et al. |
| 6,434,530 B1 | 8/2002 | Sloane et al. |
| 6,438,490 B2 | 8/2002 | Ohta |
| 6,449,485 B1 | 9/2002 | Anzil |
| 6,452,498 B2 | 9/2002 | Stewart |
| 6,456,234 B1 | 9/2002 | Johnson |
| 6,456,956 B1 | 9/2002 | Xiong |
| 6,459,782 B1 | 10/2002 | Bedrosian et al. |
| 6,463,289 B1 | 10/2002 | Havinis et al. |
| 6,477,581 B1 | 11/2002 | Carpenter |
| 6,487,305 B2 | 11/2002 | Kambe et al. |
| 6,490,454 B1 | 12/2002 | Kangas et al. |
| 6,490,519 B1 | 12/2002 | Lapidot et al. |
| 6,501,421 B1 | 12/2002 | Dutta et al. |
| 6,505,046 B1 | 1/2003 | Baker |
| 6,505,048 B1 | 1/2003 | Moles et al. |
| 6,505,123 B1 | 1/2003 | Root et al. |
| 6,507,802 B1 | 1/2003 | Payton et al. |
| 6,516,197 B2 | 2/2003 | Havinis et al. |
| 6,519,463 B2 | 2/2003 | Tendler |
| 6,526,335 B1 | 2/2003 | Treyz et al. |
| 6,529,143 B2 | 3/2003 | Mikkola et al. |
| 6,535,140 B1 | 3/2003 | Goss et al. |
| 6,542,812 B1 | 4/2003 | Obradovich et al. |
| 6,542,819 B1 | 4/2003 | Kovacs et al. |
| 6,546,360 B1 | 4/2003 | Gilbert et al. |
| 6,552,682 B1 | 4/2003 | Fan |
| 6,563,430 B1 | 5/2003 | Kemink et al. |
| 6,564,143 B1 | 5/2003 | Alewine et al. |
| 6,570,557 B1 | 5/2003 | Westerman et al. |
| 6,571,279 B1 | 5/2003 | Herz et al. |
| 6,574,484 B1 | 6/2003 | Carley |
| 6,587,688 B1 | 7/2003 | Chambers et al. |
| 6,587,782 B1 | 7/2003 | Nocek et al. |
| 6,587,835 B1 | 7/2003 | Treyz et al. |
| 6,594,480 B1 | 7/2003 | Montalvo et al. |
| 6,597,305 B2 | 7/2003 | Szeto et al. |
| 6,611,687 B1 | 8/2003 | Clark et al. |
| 6,611,788 B1 | 8/2003 | Hussa |
| 6,615,131 B1 | 9/2003 | Rennard et al. |
| 6,615,213 B1 | 9/2003 | Johnson |
| 6,647,257 B2 | 11/2003 | Owensby |
| 6,650,902 B1 | 11/2003 | Richton |
| 6,650,997 B2 | 11/2003 | Funk |
| 6,662,023 B1 | 12/2003 | Helle |
| 6,667,963 B1 | 12/2003 | Rantalainen et al. |
| 6,671,377 B1 | 12/2003 | Havinis et al. |
| 6,674,849 B1 | 1/2004 | Froeberg |
| 6,677,894 B2 | 1/2004 | Sheynblat et al. |
| 6,679,932 B2 | 1/2004 | Birler et al. |
| 6,680,694 B1 | 1/2004 | Knockeart et al. |
| 6,681,120 B1 | 1/2004 | Kim |
| 6,683,538 B1 | 1/2004 | Wilkes, Jr. |
| 6,697,018 B2 | 2/2004 | Stewart |
| 6,697,734 B1 | 2/2004 | Suomela |
| 6,711,408 B1 | 3/2004 | Raith |
| 6,711,474 B1 | 3/2004 | Treyz et al. |
| 6,718,344 B2 | 4/2004 | Hirono |
| 6,721,572 B1 | 4/2004 | Smith et al. |
| 6,731,236 B1 | 5/2004 | Hager et al. |
| 6,731,238 B2 | 5/2004 | Johnson |
| 6,738,808 B1 * | 5/2004 | Zellner et al. .................. 709/223 |
| 6,741,188 B1 | 5/2004 | Miller et al. |
| 6,741,926 B1 | 5/2004 | Zhao et al. |
| 6,748,226 B1 | 6/2004 | Wortham |
| 6,748,318 B1 | 6/2004 | Jones |
| 6,750,883 B1 | 6/2004 | Parupudi et al. |
| 6,759,960 B2 | 7/2004 | Stewart |
| 6,762,772 B1 | 7/2004 | Imamura et al. |
| 6,766,174 B1 | 7/2004 | Kenyon |
| 6,782,278 B2 | 8/2004 | Chen et al. |
| 6,789,012 B1 | 9/2004 | Childs et al. |
| 6,795,686 B2 | 9/2004 | Master et al. |
| 6,801,855 B1 | 10/2004 | Walters et al. |
| 6,810,323 B1 | 10/2004 | Bullock et al. |
| 6,813,501 B2 | 11/2004 | Kinnunen et al. |
| 6,813,503 B1 | 11/2004 | Zillikens et al. |

| | | |
|---|---|---|
| 6,816,782 B1 | 11/2004 | Walters et al. |
| 6,819,919 B1 | 11/2004 | Tanaka |
| 6,823,188 B1 | 11/2004 | Stern |
| 6,845,318 B1 | 1/2005 | Moore et al. |
| 6,847,891 B2 | 1/2005 | Pietras et al. |
| 6,847,969 B1 | 1/2005 | Mathai et al. |
| 6,853,911 B1 | 2/2005 | Sakarya |
| 6,853,917 B2 | 2/2005 | Miwa |
| 6,859,149 B1 | 2/2005 | Ohta |
| 6,865,483 B1 | 3/2005 | Cook, III et al. |
| 6,868,074 B1 | 3/2005 | Hanson |
| 6,871,144 B1 | 3/2005 | Lee |
| 6,882,313 B1 | 4/2005 | Fan et al. |
| 6,888,536 B2 | 5/2005 | Westerman et al. |
| 6,909,902 B1 | 6/2005 | Sawada et al. |
| 6,912,398 B1 | 6/2005 | Domnitz |
| 6,914,626 B2 | 7/2005 | Squibbs |
| 6,915,208 B2 | 7/2005 | Garin et al. |
| 6,933,841 B2 | 8/2005 | Muramatsu et al. |
| 6,944,447 B2 | 9/2005 | Portman et al. |
| 6,948,656 B2 | 9/2005 | Williams |
| 6,952,181 B2 | 10/2005 | Karr et al. |
| 6,954,646 B2 | 10/2005 | Churt |
| 6,954,735 B1 | 10/2005 | Djupsjobacka et al. |
| 6,957,072 B2 | 10/2005 | Kangras et al. |
| 6,975,959 B2 | 12/2005 | Dietrich et al. |
| 6,980,909 B2 | 12/2005 | Root et al. |
| 6,990,495 B1 | 1/2006 | Grason et al. |
| 6,999,779 B1 | 2/2006 | Hashimoto |
| 7,003,289 B1 | 2/2006 | Kolls |
| 7,009,556 B2 | 3/2006 | Stewart |
| 7,031,725 B2 | 4/2006 | Rorabaugh |
| 7,044,372 B2 | 5/2006 | Okuda et al. |
| 7,058,594 B2 | 6/2006 | Stewart |
| 7,076,255 B2 | 7/2006 | Parupudi et al. |
| 7,082,365 B2 | 7/2006 | Sheha et al. |
| 7,089,264 B1 | 8/2006 | Guido et al. |
| 7,096,029 B1 | 8/2006 | Parupudi et al. |
| 7,096,030 B2 | 8/2006 | Huomo |
| 7,103,470 B2 | 9/2006 | Mintz |
| 7,117,015 B2 | 10/2006 | Scheinert et al. |
| 7,120,469 B1 | 10/2006 | Urakawa |
| 7,123,189 B2 | 10/2006 | Lalik et al. |
| 7,123,926 B2 | 10/2006 | Himmelstein |
| 7,146,298 B2 | 12/2006 | Matomedi et al. |
| 7,151,921 B2 | 12/2006 | Otsuka |
| 7,165,725 B2 | 1/2007 | Casey |
| 7,171,190 B2 | 1/2007 | Ye et al. |
| 7,181,189 B2 | 2/2007 | Hotta et al. |
| 7,187,997 B2 | 3/2007 | Johnson |
| 7,200,409 B1 | 4/2007 | Ichikawa et al. |
| 7,200,566 B1 | 4/2007 | Moore et al. |
| 7,213,048 B1 | 5/2007 | Parupudi et al. |
| 7,215,967 B1 | 5/2007 | Kransmo et al. |
| 7,236,883 B2 | 6/2007 | Garin et al. |
| 7,254,481 B2 | 8/2007 | Yamada et al. |
| 7,256,711 B2 | 8/2007 | Sheha et al. |
| 7,257,392 B2 | 8/2007 | Tang et al. |
| 7,260,378 B2 | 8/2007 | Holland et al. |
| 7,266,376 B2 | 9/2007 | Nakagawa |
| 7,269,601 B2 | 9/2007 | Kinno et al. |
| 7,271,765 B2 | 9/2007 | Stilp et al. |
| 7,272,404 B2 | 9/2007 | Overy et al. |
| 7,274,332 B1 | 9/2007 | Dupray |
| 7,274,939 B2 | 9/2007 | Ruutu et al. |
| 7,280,822 B2 | 10/2007 | Fraccaroli |
| 7,295,556 B2 | 11/2007 | Roese et al. |
| 7,295,925 B2 | 11/2007 | Breed et al. |
| 7,298,327 B2 | 11/2007 | Dupray et al. |
| 7,299,008 B2 | 11/2007 | Gluck |
| 7,310,516 B1 | 12/2007 | Vacanti |
| 7,313,467 B2 | 12/2007 | Breed et al. |
| 7,319,412 B1 | 1/2008 | Coppinger et al. |
| 7,336,949 B2 | 2/2008 | Nasielski |
| 7,339,496 B2 | 3/2008 | Endo et al. |
| 7,343,564 B2 | 3/2008 | Othmer |
| 7,349,706 B2 | 3/2008 | Kim et al. |
| 7,359,713 B1 | 4/2008 | Tiwari |
| 7,370,283 B2 | 5/2008 | Othmer |
| 7,373,246 B2 | 5/2008 | O'Clair |
| 7,386,396 B2 | 6/2008 | Johnson |
| 7,389,179 B2 | 6/2008 | Jin et al. |
| 7,392,017 B2 | 6/2008 | Chu et al. |
| 7,395,031 B1 | 7/2008 | Ritter |
| 7,418,402 B2 | 8/2008 | McCrossin et al. |
| 7,421,422 B1 | 9/2008 | Dempster et al. |
| 7,421,486 B1 | 9/2008 | Parupudi et al. |
| 7,426,437 B2 | 9/2008 | Breed et al. |
| 7,427,021 B2 | 9/2008 | Kemper et al. |
| 7,433,694 B2 | 10/2008 | Morgan et al. |
| 7,440,842 B1 | 10/2008 | Vorona |
| 7,466,235 B1 | 12/2008 | Kolb et al. |
| 7,483,944 B2 | 1/2009 | Parupudi et al. |
| 7,486,201 B2 | 2/2009 | Kelly et al. |
| 7,500,607 B2 | 3/2009 | Williams |
| 7,512,487 B1 | 3/2009 | Golding et al. |
| 7,522,927 B2 | 4/2009 | Fitch et al. |
| 7,525,484 B2 | 4/2009 | Dupray et al. |
| 7,545,281 B2 | 6/2009 | Richards et al. |
| 7,558,696 B2 | 7/2009 | Vilppula et al. |
| 7,565,132 B2 | 7/2009 | Ben Ayed |
| 7,565,157 B1 | 7/2009 | Ortega et al. |
| 7,574,222 B2 | 8/2009 | Sawada et al. |
| 7,577,448 B2 | 8/2009 | Pande et al. |
| 7,587,345 B2 | 9/2009 | Mann et al. |
| 7,599,795 B1 | 10/2009 | Blumberg et al. |
| 7,603,233 B2 | 10/2009 | Tashiro |
| 7,606,580 B2 | 10/2009 | Granito et al. |
| 7,617,044 B2 | 11/2009 | Lee |
| 7,620,404 B2 | 11/2009 | Chesnais et al. |
| 7,623,848 B2 | 11/2009 | Rosenfelt et al. |
| 7,624,358 B2 | 11/2009 | Kim et al. |
| 7,647,174 B2 | 1/2010 | Kwon |
| 7,680,591 B2 | 3/2010 | Nagaa et al. |
| 7,689,916 B1 | 3/2010 | Goel et al. |
| 7,710,290 B2 | 5/2010 | Johnson |
| 7,711,478 B2 | 5/2010 | Gluck |
| 7,714,778 B2 | 5/2010 | Dupray |
| 7,743,074 B1 | 6/2010 | Parupudi et al. |
| 7,756,639 B2 | 7/2010 | Colley et al. |
| 7,768,395 B2 | 8/2010 | Gold |
| 7,792,273 B2 | 9/2010 | Fano et al. |
| 7,811,203 B2 | 10/2010 | Unuma et al. |
| 7,817,033 B2 | 10/2010 | Motoyama |
| 7,848,388 B2 | 12/2010 | Tudosoiu |
| 7,848,765 B2 | 12/2010 | Phillips et al. |
| 7,860,758 B2 | 12/2010 | McCrossin et al. |
| 7,890,123 B2 | 2/2011 | Granito et al. |
| 7,933,612 B2 | 4/2011 | Counts et al. |
| 7,933,929 B1 | 4/2011 | McClendon et al. |
| 8,036,630 B2 | 10/2011 | Park et al. |
| 2001/0018349 A1 | 8/2001 | Kinnunen et al. |
| 2001/0046884 A1 | 11/2001 | Yoshioka |
| 2002/0032035 A1 | 3/2002 | Teshima |
| 2002/0035493 A1 | 3/2002 | Mozayeny et al. |
| 2002/0035609 A1 | 3/2002 | Lessard et al. |
| 2002/0042266 A1 | 4/2002 | Heyward et al. |
| 2002/0046069 A1 | 4/2002 | Mozayeny et al. |
| 2002/0046077 A1 | 4/2002 | Mozayeny et al. |
| 2002/0046084 A1 | 4/2002 | Steele et al. |
| 2002/0067353 A1 | 6/2002 | Kenyon et al. |
| 2002/0077144 A1 | 6/2002 | Keller et al. |
| 2002/0087505 A1 | 7/2002 | Smith et al. |
| 2002/0091991 A1 | 7/2002 | Castro |
| 2002/0095486 A1 | 7/2002 | Bahl |
| 2002/0126146 A1 | 9/2002 | Burns et al. |
| 2002/0128773 A1 | 9/2002 | Chowanic et al. |
| 2002/0132625 A1 | 9/2002 | Ogino et al. |
| 2002/0140560 A1 | 10/2002 | Altman et al. |
| 2002/0160815 A1 | 10/2002 | Patel et al. |
| 2002/0167442 A1 | 11/2002 | Taylor |
| 2002/0173905 A1 | 11/2002 | Jin et al. |
| 2003/0014181 A1 | 1/2003 | Myr |
| 2003/0016804 A1 | 1/2003 | Sheha et al. |
| 2003/0032404 A1 | 2/2003 | Wager et al. |
| 2003/0055560 A1 | 3/2003 | Phillips |
| 2003/0060212 A1 | 3/2003 | Thomas |
| 2003/0060215 A1 | 3/2003 | Graham |

| | | | | | | |
|---|---|---|---|---|---|---|
| 2003/0060973 A1 | 3/2003 | Mathews et al. | | 2005/0221808 A1 | 10/2005 | Karlsson et al. |
| 2003/0060976 A1 | 3/2003 | Sato et al. | | 2005/0221843 A1 | 10/2005 | Friedman et al. |
| 2003/0065934 A1 | 4/2003 | Angelo et al. | | 2005/0222756 A1 | 10/2005 | Davis et al. |
| 2003/0069683 A1 | 4/2003 | Lapidot et al. | | 2005/0222763 A1 | 10/2005 | Uyeki |
| 2003/0078054 A1 | 4/2003 | Okuda | | 2005/0227709 A1 | 10/2005 | Chang et al. |
| 2003/0078055 A1 | 4/2003 | Smith et al. | | 2005/0228860 A1 | 10/2005 | Hamynen et al. |
| 2003/0078057 A1 | 4/2003 | Watanabe et al. | | 2005/0234637 A1 | 10/2005 | Obradovich et al. |
| 2003/0093217 A1 | 5/2003 | Petzold et al. | | 2005/0239477 A1 | 10/2005 | Kim et al. |
| 2003/0096620 A1 | 5/2003 | Ozturk et al. | | 2005/0250440 A1 | 11/2005 | Zhou et al. |
| 2003/0100326 A1 | 5/2003 | Grube et al. | | 2005/0256639 A1 | 11/2005 | Aleksic et al. |
| 2003/0100334 A1 | 5/2003 | Mazzara, Jr. | | 2005/0286421 A1 | 12/2005 | Janacek |
| 2003/0101225 A1 | 5/2003 | Han et al. | | 2006/0009908 A1 | 1/2006 | Tomita et al. |
| 2003/0134657 A1 | 7/2003 | Norta et al. | | 2006/0015249 A1 | 1/2006 | Gieseke |
| 2003/0140136 A1 | 7/2003 | Nakamura | | 2006/0022048 A1 | 2/2006 | Johnson |
| 2003/0144793 A1 | 7/2003 | Melaku et al. | | 2006/0025158 A1 | 2/2006 | Leblanc et al. |
| 2003/0148774 A1 | 8/2003 | Naghian et al. | | 2006/0038719 A1 | 2/2006 | Pande et al. |
| 2003/0158655 A1 | 8/2003 | Obradovich et al. | | 2006/0041374 A1 | 2/2006 | Inoue |
| 2003/0191578 A1 | 10/2003 | Paulauskas et al. | | 2006/0041377 A1 | 2/2006 | Jung et al. |
| 2003/0236106 A1 | 12/2003 | Master et al. | | 2006/0041378 A1 | 2/2006 | Cheng et al. |
| 2004/0010358 A1 | 1/2004 | Oesterling et al. | | 2006/0056388 A1 | 3/2006 | Livingood |
| 2004/0036649 A1 | 2/2004 | Taylor | | 2006/0058955 A1 | 3/2006 | Mehren |
| 2004/0054428 A1 | 3/2004 | Sheha et al. | | 2006/0063539 A1 | 3/2006 | Beyer, Jr. |
| 2004/0059502 A1 | 3/2004 | Levi et al. | | 2006/0069503 A1 | 3/2006 | Suomela |
| 2004/0068439 A1 | 4/2004 | Elgrably | | 2006/0085392 A1 | 4/2006 | Wang et al. |
| 2004/0072577 A1 | 4/2004 | Myllymaki et al. | | 2006/0094353 A1 | 5/2006 | Neilson et al. |
| 2004/0073361 A1 | 4/2004 | Tzamaloukas et al. | | 2006/0101005 A1 | 5/2006 | Yang et al. |
| 2004/0082351 A1 | 4/2004 | Westman | | 2006/0111122 A1 | 5/2006 | Carlsan et al. |
| 2004/0083050 A1 | 4/2004 | Biyani | | 2006/0116137 A1 | 6/2006 | Jung |
| 2004/0104842 A1 | 6/2004 | Drury et al. | | 2006/0148463 A1 | 7/2006 | Zhu et al. |
| 2004/0128067 A1 | 7/2004 | Smith | | 2006/0150119 A1 | 7/2006 | Chesnais et al. |
| 2004/0151151 A1 | 8/2004 | Kubler et al. | | 2006/0166679 A1 | 7/2006 | Karaoguz et al. |
| 2004/0158401 A1 | 8/2004 | Yoon | | 2006/0168300 A1 | 7/2006 | An et al. |
| 2004/0158584 A1 | 8/2004 | Necsoiu et al. | | 2006/0172769 A1 | 8/2006 | Oh |
| 2004/0172409 A1 | 9/2004 | James | | 2006/0172778 A1 | 8/2006 | Sundararajan et al. |
| 2004/0176907 A1 | 9/2004 | Nesbitt | | 2006/0179114 A1 | 8/2006 | Deeds |
| 2004/0180669 A1 | 9/2004 | Kall | | 2006/0180649 A1 | 8/2006 | Casey |
| 2004/0192299 A1 | 9/2004 | Wilson et al. | | 2006/0184978 A1 | 8/2006 | Casey |
| 2004/0198335 A1 | 10/2004 | Campen | | 2006/0195481 A1 | 8/2006 | Arrouye et al. |
| 2004/0198379 A1 | 10/2004 | Magee et al. | | 2006/0199567 A1 | 9/2006 | Alston |
| 2004/0198397 A1 | 10/2004 | Weiss | | 2006/0202819 A1 | 9/2006 | Adamczyk et al. |
| 2004/0203569 A1 | 10/2004 | Jijina et al. | | 2006/0211453 A1 | 9/2006 | Schick |
| 2004/0203746 A1 | 10/2004 | Knauerhase et al. | | 2006/0218209 A1 | 9/2006 | Arrouye et al. |
| 2004/0203836 A1 | 10/2004 | Gorday et al. | | 2006/0227047 A1 | 10/2006 | Rosenberg |
| 2004/0203880 A1 | 10/2004 | Riley | | 2006/0229802 A1 | 10/2006 | Vertelney et al. |
| 2004/0203909 A1 | 10/2004 | Koster | | 2006/0237385 A1 | 10/2006 | Williamson et al. |
| 2004/0215707 A1 | 10/2004 | Fujita et al. | | 2006/0247855 A1 | 11/2006 | de Silva et al. |
| 2004/0228330 A1 | 11/2004 | Kubler et al. | | 2006/0270421 A1 | 11/2006 | Phillips et al. |
| 2004/0236504 A1 | 11/2004 | Bickford et al. | | 2006/0271280 A1 | 11/2006 | O'Clair |
| 2004/0242149 A1 | 12/2004 | Luneau | | 2006/0284767 A1 | 12/2006 | Taylor |
| 2004/0246940 A1 | 12/2004 | Kubler et al. | | 2006/0287824 A1 | 12/2006 | Lin |
| 2004/0248586 A1 | 12/2004 | Patel et al. | | 2006/0291639 A1 | 12/2006 | Radziewicz et al. |
| 2004/0260939 A1 | 12/2004 | Ichikawa et al. | | 2006/0293083 A1 | 12/2006 | Bowen |
| 2004/0263084 A1 | 12/2004 | Mor et al. | | 2007/0001875 A1 | 1/2007 | Taylor |
| 2004/0264442 A1 | 12/2004 | Kubler et al. | | 2007/0003040 A1 | 1/2007 | Radziewicz et al. |
| 2005/0002419 A1 | 1/2005 | Doviak et al. | | 2007/0005118 A1 | 1/2007 | Johnson |
| 2005/0004838 A1 | 1/2005 | Perkowski et al. | | 2007/0005188 A1 | 1/2007 | Johnson |
| 2005/0009511 A1 | 1/2005 | Bostrom et al. | | 2007/0005233 A1 | 1/2007 | Pinkus et al. |
| 2005/0027442 A1 | 2/2005 | Kelley et al. | | 2007/0006098 A1 | 1/2007 | Krumm et al. |
| 2005/0033515 A1 | 2/2005 | Bozzone | | 2007/0008515 A1 | 1/2007 | Otani et al. |
| 2005/0037781 A1 | 2/2005 | Ozugur et al. | | 2007/0010942 A1 | 1/2007 | Bill |
| 2005/0039140 A1 | 2/2005 | Chen | | 2007/0016362 A1 | 1/2007 | Nelson |
| 2005/0046584 A1 | 3/2005 | Breed | | 2007/0027614 A1 | 2/2007 | Reeser et al. |
| 2005/0071078 A1 | 3/2005 | Yamada et al. | | 2007/0027628 A1 | 2/2007 | Geelen |
| 2005/0071702 A1 | 3/2005 | Morisawa | | 2007/0042790 A1 | 2/2007 | Mohi et al. |
| 2005/0075116 A1 | 4/2005 | Laird | | 2007/0055684 A1 | 3/2007 | Steven |
| 2005/0085272 A1 | 4/2005 | Anderson et al. | | 2007/0061245 A1 | 3/2007 | Ramer et al. |
| 2005/0091408 A1 | 4/2005 | Parupudi et al. | | 2007/0061301 A1 | 3/2007 | Ramer et al. |
| 2005/0096840 A1 | 5/2005 | Simske | | 2007/0061363 A1 | 3/2007 | Ramer et al. |
| 2005/0114021 A1 | 5/2005 | Krull et al. | | 2007/0071114 A1 | 3/2007 | Sanderford et al. |
| 2005/0130677 A1 | 6/2005 | Meunier et al. | | 2007/0073480 A1 | 3/2007 | Singh |
| 2005/0134440 A1 | 6/2005 | Breed | | 2007/0073719 A1 | 3/2007 | Ramer et al. |
| 2005/0134578 A1 | 6/2005 | Chambers et al. | | 2007/0087726 A1 | 4/2007 | McGary et al. |
| 2005/0149250 A1 | 7/2005 | Isaac | | 2007/0093258 A1 | 4/2007 | Steenstra et al. |
| 2005/0153681 A1 | 7/2005 | Hanson | | 2007/0106465 A1 | 5/2007 | Adam et al. |
| 2005/0176411 A1 | 8/2005 | Taya | | 2007/0115868 A1* | 5/2007 | Chen et al. ............ 370/315 |
| 2005/0186954 A1 | 8/2005 | Kenney | | 2007/0124043 A1 | 5/2007 | Ayoub et al. |
| 2005/0197767 A1 | 9/2005 | Nortrup | | 2007/0124058 A1 | 5/2007 | Kitagawa et al. |
| 2005/0203698 A1 | 9/2005 | Lee | | 2007/0124066 A1 | 5/2007 | Kikuchi |
| 2005/0221799 A1 | 10/2005 | Tervo et al. | | 2007/0127439 A1 | 6/2007 | Stein |

| | | | | | | |
|---|---|---|---|---|---|---|
| 2007/0127661 A1 | 6/2007 | Didcock | | 2008/0140520 A1 | 6/2008 | Hyder et al. |
| 2007/0129888 A1 | 6/2007 | Rosenberg | | 2008/0153512 A1 | 6/2008 | Kale et al. |
| 2007/0130153 A1 | 6/2007 | Nachman et al. | | 2008/0153513 A1 | 6/2008 | Kale et al. |
| 2007/0135136 A1 | 6/2007 | Ische | | 2008/0155453 A1 | 6/2008 | Othmer |
| 2007/0135990 A1 | 6/2007 | Seymour et al. | | 2008/0160956 A1 | 7/2008 | Jackson et al. |
| 2007/0142026 A1 | 6/2007 | Kuz et al. | | 2008/0161034 A1 | 7/2008 | Akiyama |
| 2007/0149212 A1 | 6/2007 | Gupta et al. | | 2008/0167083 A1 | 7/2008 | Wyld et al. |
| 2007/0150320 A1 | 6/2007 | Huang | | 2008/0167796 A1 | 7/2008 | Narayanaswami |
| 2007/0153983 A1 | 7/2007 | Bloebaum et al. | | 2008/0167811 A1 | 7/2008 | Geelen |
| 2007/0153984 A1 | 7/2007 | Bloebaum et al. | | 2008/0172173 A1* | 7/2008 | Chang et al. .................. 701/207 |
| 2007/0153986 A1 | 7/2007 | Bloebaum et al. | | 2008/0172374 A1 | 7/2008 | Wolosin et al. |
| 2007/0155360 A1 | 7/2007 | An | | 2008/0176545 A1 | 7/2008 | Dicke |
| 2007/0156326 A1 | 7/2007 | Nesbitt | | 2008/0177793 A1 | 7/2008 | Epstein et al. |
| 2007/0179854 A1 | 8/2007 | Ziv et al. | | 2008/0178116 A1 | 7/2008 | Kim |
| 2007/0184855 A1 | 8/2007 | Klassen | | 2008/0186162 A1 | 8/2008 | Rajan et al. |
| 2007/0191029 A1 | 8/2007 | Zarem et al. | | 2008/0189033 A1 | 8/2008 | Geelen et al. |
| 2007/0200713 A1 | 8/2007 | Weber et al. | | 2008/0194273 A1 | 8/2008 | Kansal et al. |
| 2007/0204218 A1 | 8/2007 | Weber et al. | | 2008/0200142 A1 | 8/2008 | Abdel-Kader et al. |
| 2007/0206730 A1 | 9/2007 | Polk | | 2008/0207167 A1 | 8/2008 | Bugenhagen |
| 2007/0208492 A1 | 9/2007 | Downs et al. | | 2008/0225779 A1 | 9/2008 | Bragiel et al. |
| 2007/0208497 A1 | 9/2007 | Downs et al. | | 2008/0227473 A1 | 9/2008 | Haney |
| 2007/0208498 A1 | 9/2007 | Barker et al. | | 2008/0233919 A1 | 9/2008 | Kenney |
| 2007/0218925 A1 | 9/2007 | Islam et al. | | 2008/0248815 A1 | 10/2008 | Busch |
| 2007/0219706 A1 | 9/2007 | Sheynblat | | 2008/0249667 A1 | 10/2008 | Horvitz et al. |
| 2007/0229549 A1 | 10/2007 | Dicke et al. | | 2008/0268876 A1 | 10/2008 | Gelfand et al. |
| 2007/0232272 A1 | 10/2007 | Gonsalves et al. | | 2008/0271072 A1 | 10/2008 | Rothschild et al. |
| 2007/0232326 A1 | 10/2007 | Johnson | | 2008/0284642 A1 | 11/2008 | Seacat et al. |
| 2007/0233387 A1 | 10/2007 | Johnson | | 2008/0287124 A1 | 11/2008 | Karabinis |
| 2007/0238491 A1 | 10/2007 | He | | 2008/0288166 A1 | 11/2008 | Onishi |
| 2007/0243853 A1 | 10/2007 | Bumiller et al. | | 2008/0293397 A1 | 11/2008 | Gajdos et al. |
| 2007/0247435 A1 | 10/2007 | Benko et al. | | 2008/0310850 A1 | 12/2008 | Pederson et al. |
| 2007/0254676 A1 | 11/2007 | Pedigo et al. | | 2008/0318550 A1 | 12/2008 | DeAtley |
| 2007/0259674 A1 | 11/2007 | Neef et al. | | 2008/0319644 A1 | 12/2008 | Zehler |
| 2007/0260751 A1 | 11/2007 | Meesseman | | 2008/0319652 A1 | 12/2008 | Moshfeghi |
| 2007/0266116 A1 | 11/2007 | Rensin et al. | | 2009/0003659 A1 | 1/2009 | Forstall et al. |
| 2007/0271328 A1 | 11/2007 | Geelen et al. | | 2009/0005005 A1 | 1/2009 | Forstall et al. |
| 2007/0276586 A1 | 11/2007 | Jeon et al. | | 2009/0005018 A1 | 1/2009 | Forstall et al. |
| 2007/0276587 A1 | 11/2007 | Johnson | | 2009/0005021 A1 | 1/2009 | Forstall et al. |
| 2007/0276596 A1 | 11/2007 | Solomon et al. | | 2009/0005068 A1 | 1/2009 | Forstall et al. |
| 2007/0281664 A1 | 12/2007 | Kaneko et al. | | 2009/0005070 A1 | 1/2009 | Forstall et al. |
| 2007/0282521 A1 | 12/2007 | Broughton | | 2009/0005071 A1 | 1/2009 | Forstall et al. |
| 2007/0282565 A1 | 12/2007 | Bye et al. | | 2009/0005072 A1 | 1/2009 | Forstall et al. |
| 2007/0290920 A1 | 12/2007 | Shintai et al. | | 2009/0005076 A1 | 1/2009 | Forstall et al. |
| 2007/0299601 A1 | 12/2007 | Zhao et al. | | 2009/0005080 A1 | 1/2009 | Forstall et al. |
| 2008/0004789 A1 | 1/2008 | Horvitz et al. | | 2009/0005082 A1 | 1/2009 | Forstall et al. |
| 2008/0004791 A1 | 1/2008 | Sera | | 2009/0005964 A1 | 1/2009 | Forstall et al. |
| 2008/0004802 A1 | 1/2008 | Horritt | | 2009/0005965 A1 | 1/2009 | Forstall et al. |
| 2008/0005104 A1 | 1/2008 | Flake et al. | | 2009/0005975 A1 | 1/2009 | Forstall et al. |
| 2008/0005301 A1 | 1/2008 | Li et al. | | 2009/0005978 A1 | 1/2009 | Forstall et al. |
| 2008/0015422 A1 | 1/2008 | Wessel | | 2009/0005981 A1 | 1/2009 | Forstall et al. |
| 2008/0021632 A1 | 1/2008 | Amano | | 2009/0006336 A1 | 1/2009 | Forstall et al. |
| 2008/0024360 A1 | 1/2008 | Taylor | | 2009/0018769 A1 | 1/2009 | Poliak |
| 2008/0024364 A1 | 1/2008 | Taylor | | 2009/0030605 A1 | 1/2009 | Breed |
| 2008/0027636 A1 | 1/2008 | Tengler et al. | | 2009/0031006 A1 | 1/2009 | Johnson |
| 2008/0030308 A1 | 2/2008 | Johnson | | 2009/0033540 A1 | 2/2009 | Breed et al. |
| 2008/0032703 A1 | 2/2008 | Krumm et al. | | 2009/0042585 A1 | 2/2009 | Matsuda |
| 2008/0032721 A1 | 2/2008 | MacDonald et al. | | 2009/0089706 A1 | 4/2009 | Furches et al. |
| 2008/0045234 A1 | 2/2008 | Reed | | 2009/0098857 A1 | 4/2009 | DeAtley |
| 2008/0046176 A1 | 2/2008 | Jurgens | | 2009/0121927 A1 | 5/2009 | Moshfeghi |
| 2008/0052407 A1 | 2/2008 | Baudino et al. | | 2009/0143048 A1 | 6/2009 | Ayanamcottil et al. |
| 2008/0065311 A1 | 3/2008 | Bauchot et al. | | 2009/0177385 A1 | 7/2009 | Matas et al. |
| 2008/0070593 A1 | 3/2008 | Altman et al. | | 2009/0182492 A1 | 7/2009 | Alten |
| 2008/0071466 A1 | 3/2008 | Downs et al. | | 2009/0201850 A1* | 8/2009 | Davis et al. .................. 370/328 |
| 2008/0082254 A1 | 4/2008 | Huhtala et al. | | 2009/0215469 A1* | 8/2009 | Fisher et al. ................ 455/456.3 |
| 2008/0085727 A1 | 4/2008 | Kratz | | 2009/0228961 A1 | 9/2009 | Wald et al. |
| 2008/0086240 A1 | 4/2008 | Breed | | 2009/0234743 A1 | 9/2009 | Wald et al. |
| 2008/0088486 A1 | 4/2008 | Rozum et al. | | 2009/0259573 A1 | 10/2009 | Cheng et al. |
| 2008/0091347 A1 | 4/2008 | Tashiro | | 2009/0271271 A1 | 10/2009 | Johnson |
| 2008/0096518 A1 | 4/2008 | Mock et al. | | 2009/0281724 A1 | 11/2009 | Blumenberg et al. |
| 2008/0097698 A1 | 4/2008 | Arnold-Huyser et al. | | 2009/0286549 A1 | 11/2009 | Canon et al. |
| 2008/0098090 A1 | 4/2008 | Geraci et al. | | 2009/0315766 A1 | 12/2009 | Khosravy et al. |
| 2008/0104634 A1 | 5/2008 | Gajdos et al. | | 2009/0315775 A1 | 12/2009 | Khosravy et al. |
| 2008/0109153 A1 | 5/2008 | Gueziec | | 2009/0325603 A1 | 12/2009 | Van Os et al. |
| 2008/0113672 A1 | 5/2008 | Karr et al. | | 2009/0326815 A1 | 12/2009 | Williamson et al. |
| 2008/0129528 A1 | 6/2008 | Guthrie | | 2010/0054242 A1* | 3/2010 | Oliver et al. .................. 370/389 |
| 2008/0132243 A1 | 6/2008 | Spalink et al. | | 2010/0082820 A1 | 4/2010 | Furukawa |
| 2008/0132251 A1 | 6/2008 | Altman et al. | | 2010/0106397 A1 | 4/2010 | Van Essen |
| 2008/0132252 A1 | 6/2008 | Altman et al. | | 2010/0131584 A1 | 5/2010 | Johnson |
| 2008/0140308 A1 | 6/2008 | Yamane et al. | | 2010/0173647 A1 | 7/2010 | Sheynblat |

| | | |
|---|---|---|
| 2010/0207782 A1 | 8/2010 | Johnson |
| 2010/0223006 A1 | 9/2010 | Sasaki |
| 2010/0267357 A1 | 10/2010 | Holmstrom et al. |
| 2011/0039513 A1 | 2/2011 | Carlstrom |
| 2011/0051658 A1 | 3/2011 | Jin et al. |

FOREIGN PATENT DOCUMENTS

| | | |
|---|---|---|
| CA | 2163215 | 5/1994 |
| CA | 2287596 | 4/2000 |
| CA | 2432239 | 12/2004 |
| DE | 3 621 456 | 1/1988 |
| DE | 4437360 | 4/1996 |
| DE | 19506890 | 8/1996 |
| DE | 19914257 | 3/1999 |
| DE | 10 141 695 | 3/2003 |
| EP | 0 288 068 | 7/1992 |
| EP | 0 745 867 | 12/1996 |
| EP | 0 763 749 | 3/1997 |
| EP | 0 786 646 | 7/1997 |
| EP | 785535 | 7/1997 |
| EP | 0 809 117 | 11/1997 |
| EP | 0 813 072 | 12/1997 |
| EP | 0 699 330 | 4/1998 |
| EP | 0 908 835 | 4/1999 |
| EP | 0 997 808 | 5/2000 |
| EP | 1 083 764 | 3/2001 |
| EP | 1 300 652 | 4/2003 |
| EP | 1 457 928 | 9/2004 |
| EP | 1 469 287 | 10/2004 |
| EP | 1 496 338 | 1/2005 |
| EP | 1 770 956 | 9/2005 |
| EP | 1 465 041 | 2/2006 |
| EP | 1 659 817 | 5/2006 |
| EP | 1 790 947 | 5/2007 |
| EP | 1 860 904 | 11/2007 |
| EP | 1 933 249 | 8/2008 |
| FR | 2730083 | 8/1996 |
| FR | 2754093 | 4/1998 |
| FR | 2272911 | 6/1999 |
| FR | 2810183 | 12/2001 |
| GB | 2 278 196 | 11/1994 |
| GB | 2 322 248 | 8/1998 |
| GB | 2 359 888 | 5/2001 |
| GB | 2 407 230 | 4/2005 |
| JP | 62142215 | 6/1987 |
| JP | 05-071974 | 3/1993 |
| JP | 06-525189 | 5/1994 |
| JP | 2007-221433 | 5/1994 |
| JP | 08-069436 | 3/1996 |
| JP | 09-054895 | 2/1997 |
| JP | 09-098474 | 4/1997 |
| JP | 9-113288 | 5/1997 |
| JP | 09-153125 | 6/1997 |
| JP | 9-062993 | 7/1997 |
| JP | 09-200850 | 7/1997 |
| JP | 9-210710 | 8/1997 |
| JP | 9-319300 | 12/1997 |
| JP | 10-021259 | 1/1998 |
| JP | 11-234736 | 8/1999 |
| JP | 2000-163379 | 6/2000 |
| JP | 2001-160063 | 6/2001 |
| JP | 2002-310680 | 10/2002 |
| JP | 10-030933 | 2/2003 |
| JP | 2003-228532 | 8/2003 |
| JP | 2004-045054 | 2/2004 |
| JP | 2004-219146 | 7/2004 |
| JP | 2004-362271 | 12/2004 |
| JP | 2005-106741 | 4/2005 |
| JP | 2005-182146 | 7/2005 |
| JP | 2005-241519 | 9/2005 |
| JP | 2006-112338 | 4/2006 |
| JP | 2006-184007 | 7/2006 |
| JP | 2006-270889 | 10/2006 |
| JP | 2006-279838 | 10/2006 |
| JP | 2007-033220 | 2/2007 |
| JP | 2007-033331 | 2/2007 |
| JP | 2007-033368 | 2/2007 |
| JP | 2007-127439 | 5/2007 |
| JP | 2007-147439 | 6/2007 |
| JP | 2007-201699 | 8/2007 |
| JP | 2007-240400 | 9/2007 |
| JP | 2007-259291 | 10/2007 |
| JP | 2007-271299 | 10/2007 |
| JP | 2007-304009 | 11/2007 |
| JP | 2008-058917 | 3/2008 |
| JP | 2008-129774 | 6/2008 |
| KR | 2004-102440 | 12/2004 |
| KR | 2005-096746 | 10/2005 |
| TW | 200426387 | 12/2004 |
| WO | WO 93/20546 | 10/1993 |
| WO | WO 94/08250 | 4/1994 |
| WO | WO 97/07467 | 2/1997 |
| WO | WO 97/24577 | 7/1997 |
| WO | WO 97/41654 | 11/1997 |
| WO | WO 98/03951 | 1/1998 |
| WO | WO 98/07112 | 2/1998 |
| WO | WO 98/54682 | 12/1998 |
| WO | WO 99/16036 | 4/1999 |
| WO | WO 99/44183 | 9/1999 |
| WO | WO 99/61934 | 12/1999 |
| WO | WO 01/31966 | 5/2001 |
| WO | WO 01/37597 | 5/2001 |
| WO | WO 02/54813 | 7/2002 |
| WO | WO 03/023593 | 3/2003 |
| WO | WO 2004/008792 | 3/2003 |
| WO | WO 03/096055 | 11/2003 |
| WO | WO 2004/021730 | 3/2004 |
| WO | WO 2004/061576 | 7/2004 |
| WO | WO 2004/076977 | 9/2004 |
| WO | WO 2005/006258 | 1/2005 |
| WO | WO 2005/084052 | 9/2005 |
| WO | WO 2006/065856 | 6/2006 |
| WO | WO 2006/113125 | 10/2006 |
| WO | WO 2007/027065 | 3/2007 |
| WO | WO 2007/052285 | 5/2007 |
| WO | WO 2008/051929 | 5/2008 |
| WO | WO 2008/085740 | 7/2008 |
| WO | WO 2009/140031 | 11/2009 |

OTHER PUBLICATIONS

Yogesh C. Rathod, Third Party Submission in U.S. Appl. No. 12/233,358 mailed Mar. 30, 2010, 12 pages.
Budka et al., "A Bayesian method to Improve Mobile Geolocation Accuracy", IEEE, 2002, pp. 1021-1025.
Yamamoto et al., "Position Location Technologies Using Signal Strength in Cellular Systems", IEEE, 2001, pp. 2570-2575.
International Search Report and Written Opinion, dated Oct. 1, 2009, issued in PCT/US2009/041298.
U.S. Appl. No. 11/464,671, filed Aug. 15, 2006, Johnson.
U.S. Appl. No. 11/827,065, filed Jul. 10, 2007, Johnson.
U.S. Appl. No. 12/119,316, filed May 12, 2008, Blumenberg et al.
U.S. Appl. No. 12/122,339, filed May 16, 2008, Sazegari et al.
U.S. Appl. No. 12/044,363, filed Mar. 7, 2008, Johnson.
"dialDTMF," [online] [Retrieved Jan. 10, 2008]; Retrieved from the Internet URL: http://dialdtmf.sourceforge.net/; 9 pages.
Maxwell et al., "Alfred: The Robot Waiter Who Remembers You," *AAAI Technical Report WS-99-15*, 1999, 12 pages.
Shibata et al., "Development and Integration of Generic Components for a Teachable Vision-Based Mobile Robot," *IEEE/ASME Transactions on Mechatronics*, 1996, 1(3):230-236.
"27 Countries in your pocket"; [online] [Retrieved on Sep. 29, 2005] Retrieved from the Internet <URL: http://www.mio-tech.be/en/printview/press-releases-2005-09-29.htm; 1 page.
"Animated Transition"; [online] [Retrieved on Oct. 16, 2006] Retrieved from the Internet <URL: http://designinterfaces.com/Animated_Transition; 2 pages.
"DaimlerCrysler Guide5 Usecases Overview Map", 1 page (no reference date).
"FAQ"; [online] [Retrieved Nov. 30, 2007] Retrieved from the Internet, URL: http://www.navizon.com/FAQ.htm; 8 pages.
"How it Works"; Navizon—Peer-to-Peer Wireless Positioning; [online] [Retrieved on Nov. 30, 2007]; Retrieved from the Internet, URL: http://www.navizon.com/FullFeatures.htm, 7 pages.

"International Roaming Guide—Personal Experience(s) from Customer and Community Member"; [online] [Retrieved Jun. 26, 2006] Retrieved from the Internet <URL: http://forums.cingular.com/cng/board/message?board.id=1185; 6 pages.

"iPhone Software/Hardware Hack: LocoGPS—GPS Add-on for the iPhone"; [online] [Retrieved on Dec. 25, 2007] Retrieved from the Internet <URL: http://www.iphonehacks.com/iphone_applications/index.html; 41 pages.

"Mio 269+ Users Manula"; 2005; 44 pages.

"MOREnet Dialing Plan: PSTN and IP Network Integration for H.323, H320 VoIP and Public Voice Networks", [online] [Retrieved on Jan. 11, 2008] Retrieved from the Internet < URL: http://www.more.net/technical/research/dialplan/index.html, 12 pages.

"New program for mobile blogging for PocketPC released: My Blog"; [online] [Retrieved on Apr. 5, 2006); Retrieved from the Internet, URL: http://msmobiles.com/news.php/4067.html.

"Numbering and Dialing Plan within the United States", Alliance for Telecommunications Industry Solutions; 2005; 17 pages.

"nüvifone Images"; [online] [Retrieved on Feb. 4, 2008]; Retrieved from the Internet, URL: http://www8.garmin.com/buzz/nuvifone/media_gallery.jsp; 2 pages.

Review Guide—Google Maps for mobile (beta); Google; 2006; 7 pages.

"User-centered design of mobile solutions", NAMAHN, 2006, 18 pages.

"User's Manual MioMap 2.0"; Aug. 2005; 60 pages.

"Windows Live Search for Mobile Goes Final, Still Great"; [online] [Retrieved on Mar. 11, 2007]; Retrieved from the Internet, URL: http://gizmodo.com/gadgets/software/windows-live-search-for-mobile-goes-final-still-great-236002.php; 3 pages.

"Windows Mobile 6 Professional Video Tour"; [online] [Retrieved on Mar. 11, 2007]; Retrieved from the Internet, URL: http://gizmodo.com/gadgets/cellphones/windows-mobile-6-professional-video-tour-237039.php; 4 pages.

"Windows Mobile"; Microsoft; 2007, 2 pages.

Anand et al., "Quantitative Analysis of Power Consumption for Location-Aware Applications on Smart Phones", IEEE International Symposium on Industrial Electronics, 2007.

Balliet, "Transportation Information Distribution System", IBM Technical Disclosure Bulletin, [online] [Retrieved Nov. 7, 2008] Retrieved from the Internet, URL: https://www.delphion.com/tdbs/tdb?order=86A+61395; Jun. 1986; 2 pages.

Beard et al., "Estimating Positions and Paths of Moving Objects", IEEE 2000, pp. 1-8.

Bederson, B.B., Audio Augmented Reality: A Prototype Automated Tour Guide [online] [retrieved on Aug. 30, 2002] [retrieved from http://www.cs.umd.edu/~bederson/papers/chi-95-aar/] pp. 1-4.

Berman et al., "The Role of Dead Reckoning and Inertial Sensors in Future General Aviation Navigation", IEEE, 1998, pp. 510-517.

Bevly et al., "Cascaded Kalman Filters for Accurate Estimation of Multiple Biases, Dead-Reckoning Navigation, and Full State Feedback Control of Ground Vehicles", IEEE Transactions on Control Systems in Technology, vol. 15, No. 2, Mar. 2007, pp. 199-208.

Binzhuo et al., "Mobile Phone GIS Based on Mobile SVG", IEEE 2005.

Bokharouss et al., "A Location-Aware Mobile Call Handling Assistant", International Conference on Advanced Information Networking and Applications Workshops, 2007.

Boonsrimuang et al., "Mobile Internet Navigation System", IEEE, 2002, pp. 325-328.

Camp et al., "A computer-based method for predicting transit time systems", Decsision Sciences, vol. 5, pp. 339-346, 1974.

Carew; "Phones that tell you where to drive, meet, eat"; [online] [Retrieved May 26, 2007]; Retrieved from the Internet <URL httlp://news.yahoo.com/s/nm/20070525/wr_nm/column_pluggedin_dc_2&printer=1;_ylt=Ahqaftn7x m1S2r0FZFeu9G4ht.cA; 2 pages.

Charny, "AT&T puts 411 to the text"; [online] [Retrieved Mar. 4, 2009]; Retrieved from the Internet <URL http://news.cnet.com/ATT-puts-411-to-the-text/2100-1039_3-1000669.html; May 8, 2003; 2 pages.

Cho et al., A Traveler Information Service Structure in Hybrid T-DMB and Cellular Communication Network, Broadcast Systems Research Group, IEEE, 2006, pp. 747-750.

Christie et al., "Development and Deployment of GPS wireless devices for E911 and Location based services", IEEE 2002.

Chua et al., "Intelligent Portal for Event-triggered SMS Alerts", 2nd International Conference on Mobile Technology, Applications and Systems, 2005.

Civilis et al., "Efficient Tracking of Moving Objects with Precision Guarantees", IEEE, Proceedings of the First Annual International Conference on Mobile and Ubiquitous Systems: Networking and Services, 2004, 10 pages.

Dalrymple, Jim; "Google Maps adds locator, but not for iPhone", [online] [Retrieved Nov. 30, 2007]; Retrieved from the Internet <URL: http://news.yahoo.com/s/macworld/20071130/tc_macworld/googlemaps20071130_0&printer=1;_ylt=Auvf3s6LQK_pOaJ1b954T_DQn6gB; 1 page.

Dibdin, Peter, "Where are mobile location based services?", Dec. 14, 2001, pp. 1-8.

Dunn et al., "Wireless Emergency Call System", IBM TDB, Sep. 1994.

Ebine, "Dual Frequency resonant base station antennas for PDC systems in Japan", IEEE, pp. 564-567, 1999.

Evans, "In-Vehicle Man-Machine Interaction the Socrates Approach", Vehicle Navigation & Information System Conference Proceedings, Aug. 31, 1994-Sep. 2, 1994, pp. 473-477.

FM 3-25.26 Map Reading and Land Navigation Field Manual No. 3-25.26, Headquarters Department of the Army, Washington, DC [online] [retrieved on Apr. 9, 2004] [retrieved from http://155.217.58.58/cgi-bin/atdl.d11/fm/3-25.26/toc.htm] Jul. 20, 2001, pp. 1-7 and J-1 to J-3.

*GPS 12 Personal Navigator Owner's Manual & Reference*, Garmin Corporation, Jan. 1999, pp. 1-60.

Guo et al., "An Intelligent Query System based on Chinese Short Message Service for Restaurant Recommendation", IEEE 2007, 1 page.

Hameed et al., "An Intelligent Agent-Based Medication and Emergency System", IEEE 2006.

Helal et al., "Drishti: An Integrated Navigation System for Visually Impaired and Disabled", Fifth International Symposium on Wearable Computers (ISWC'01), IEEE, 2001, pp. 149-156.

Hohman et al., "GPS Roadside Integrated Precision Positioning System", Position Location and Navigation Symposium (IEEE 2000), pp. 221-230.

International Numbering and SMS—Type of Numbering, TON, Numbering Plan Indicator, NPI, [online] [Retrieved Jan. 5, 2007] Retrieved from the Internet <URL: http://www.activeexperts.com/support/activsms/tonnpi/.

Jain, R., Potential Networking Applications of Global Positioning Systems (GPS) [online] [retrieved on Nov. 18, 2008] [retrieved from http://arxiv.org/ftp/cs/papers/9809/9809079.pdf] OSU Technical Report TR-24, Apr. 1996, pp. 1-40.

Jirawimut et al., "A Method for Dead Reckoning Parameter Correction in Pedestrian Navigation System", IEEE Transactions on Instrumentation and Measurement, vol. 52, No. 1, Feb. 2003, pp. 209-215.

Ju et al., "RFID Data Collection and Integration based on Mobile Agent", IEEE, 2006.

Kbar et al., "Mobile Station Location based on Hybrid of Signal Strength and Time of Arrival", IEEE, 2005.

Koide et al., "3-D Human Navigation System with Consideration of Neighboring Space Information", IEEE International Conference on Systems, Man and Cybernetics, 2006 (SMC '06), vol. 2, (Oct. 8-11, 2006), pp. 1693-1698.

Lloyd et al., "Cellular phone base stations installation violate the Electromagnetic Compatibility regulations", IEEE, 2004.

Manabe et al., "On the M-CubITS Pedestrian Navigation System", IEEE, 2006, pp. 793-798.

Meier et al., "Location-Aware Event-Base Middleware: A Paradigm for Collaborative Mobile Applications?", Sep. 2003.

Miller et al., "Synchronization of Mobile XML Databases by Utilizing Deferred Views", IEEE 2004.

Nardi et al., "Integrating Communication and Information through Contact Map", Communications of the ACM, vol. 45, No. 4, Apr. 2002.

Navizon Peer-to-Peer Wireless Positioning; [online] [Retrieved on Nov. 30, 2007]; Retrieved from the Internet, URL: http//www.navizon.com/; 2 pages.

Northard, "Docking Station Communication Link", IBM TDB, Feb. 1994.

Oh et al., "Spatial Applications Using 4S Technology for Mobile Environment", IEEE 2002.

Paksoy et al., "The Global Position System-Navigation Tool of the Future", Journal of Electrical & Electronics, 2002, vol. 2, No. 1, pp. 467-476.

Parikh, "Tele Locate", IBM Technical Disclosure Bulletin, [online] [Retrieved Nov. 7, 2008] Retrieved from the Internet, URL: https://www.delphion.com/tdbs/tdb?order=92A+62775; Sep. 1992; 1 page.

Partial International Search Report, dated Jul. 29, 2008, issued in corresponding PCT/US2008/050295.

International Search Report and Written Opinion, dated Jun. 9, 2008, issued in Interntiaonal Application No. PCT/US2007/088880, filed Dec. 27, 2007.

Pfoser et al., "Dynamic Travel Time Maps—Enabling Efficient Navigation", Proceedings of the 18th International Conference on Scientific and Statistical Database Management (SSDBM'06), IEEE, 10 pages.

Portfolio 2007; [online] [Retrieved on Jun. 14, 2007]; Retrieved from the Internet, URL: http://eric.wahlforss.com/folio; 3 pages.

RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.

Rekimoto, J., *Augment-able Reality: Situated Communication through Physical and Digital Spaces*, iswc, pp. 68, Second International Symposium on Wearable computers (ISWC'98), 1998, pp. 1-8.

Rogers et al., "Adaptive User Interfaces for Automotive Environments", IEEE Intelligent Vehicles Symposium 2000, Oct. 3-5, 2000, pp. 662-667.

Rozier, J., *Hear & There: An Augmented Reality System of Linked Audio*, Proceedings of the International Conference on Auditory Display, Atlanta, GA, Apr. 2000, pp. 1-6.

Samadani et al., "PathMaker: Systems for Capturing Trips", IEEE (2004) International Conference on Multimedia and Expo., Publication Date: Jun. 27-30, 2004, vol. 3, pp. 2123-2126, 2004.

Schreiner, "Where We At? Mobile Phones Bring GPS to the Masses", IEEE Computers Society, May/Jun. 2007, pp. 6-11.

Spohrer. "New Paradigms for Using Computers", 1997; retrieved from the Internet, URL: <http://almaden.ibm.com/npuc97/1997/spohrer.htm>.

Sung et al., "Towards Reliable Peer-to-Peer Data Sharing over Mobile Ad hoc Networks", IEEE, 2005.

Weiss et al., "Zone services—An approach for location-based data collection", Proceedings of the 8th International Conference on E-commerce Technology and the 3rd IEEE International Conference on Enterprise Computing, E-Commerce and E-Services (8 pages), 2006.

Yang et al., "A Mutlimedia System for Route Sharing and Video-based Navigation", IEEE, 2006, pp. 73-76.

Yang et al. "Global Snapshots for Distributed Debugging", IEEE, pp. 436-440, 1992.

Yanyan et al., "The model of optimum route selection in vehicle automatic navigation system based on unblocked reliability analyses", IEEE 2003.

"Cyberguide: a mobile context-aware tour guide", Wireless Networks Archive (Special Issue: Mobile computing and networking; selecting papers from MobiCom '96), 3(5):421-433, 1997.

"Frontiers in electronic media", Interactions Archive 4(4):32-64, 1997.

"Location-aware mobile applications based on directory services", International Conference on Mobile Computing and Networking Archive, Proceedings on the 3rd Annual ACM/IEEE International Conference on Mobile Computing and Networking, Budapest, Hungary, pp. 23-33, 1997.

Sharp et al., U.S. Appl. No. 12/434,586, filed May 1, 2009.
Sharp et al., U.S. Appl. No. 12/434,582, filed May 1, 2009.
Van Os et al., U.S. Appl. No. 12/165,413, filed Jun. 30, 2008.
Blumenberg et al., U.S. Appl. No. 12/119,316, filed May 12, 2008.
Sazegari et al., U.S. Appl. No. 12/122,339, filed May 16, 2008.
Johnson, U.S. Appl. No. 12/044,363, filed Mar. 7, 2008.
Johnson, U.S. Appl. No. 11/827,065, filed Jul. 10, 2007.
Herz, U.S. Appl. No. 12/270,814, filed Nov. 13, 2008.

Drane et al., "The accurate location of mobile telephones", Third Annual World Congress on Intelligent Transport Systems, Orlando, Florida, Oct. 1996.

"Travel Time Data Collection Handbook—Chapter 5: Its Probe Vehicle Techniques", FHWA-PL-98-035 Report, Department of Transport, University of Texas, Mar. 1998; [online] [Retrieved from the Internet at http://www.fhwa.dot.gov/ohim/handbook/chap5.pdf.

Ygnace et al., "Travel Time Estimation on the San Francisco Bay Area Network Using Cellular Phones as Probes", Working Paper, Institute of Transportation Studies, University of California, Berkeley, 2000.

Wang et al., "A Unified Vehicle Supervising and Traffic Information System", IEEE, 1996, pp. 968-972.

Weiss et al., "Zone services—An approach for location-based data collection", Proceedings of the 8th International Conference on E-commerce Technology and the 3rd IEEE International Conference on Enterprise Computing, E-Commerce and E-Services, 2006; 8 pages.

US 6,731,928, May 2004, Tanaka, (withdrawn).

Dey, "Context-Aware Computing: The CyberDesk Project," [online] Retrieved from the Internet: URL: http://www.cc.gatech.edu/fce/cyberdesk/pubs/AAAI98/AAAI98.html; AAAI '98 Spring Symposium, Stanford University, Mar. 23-25, 1998, downloaded from the Internet on Aug. 6, 2010, 8 pages.

Challe, "Carminat-An Integrated information and guidance system," Vehicle Navigation and Information Systems Conference, Oct. 20-23, 1991, Renault—Direction de la Recherche, Rueil-Malmaison, France.

Pungel, "Traffic control-beat the jam electronically," Funkschau, 1988, 18:43-45 (w/English translation).

Rillings and Betsold, "Advanced driver information systems," Vehicular Technology, IEEE Vehicular Technology Society, 1991, 40:31-40.

Tsuzawa and Okamoto, "Advanced Mobile Traffic Information and Communication System," First Vehicle Navigation and Information Systems Conference, Sep. 11-13, 1989, Toronto, Canada, Abstract only.

Wong, "GPS: making roads safer and solving traffic tangles," Asia Engineer, 1995, 23(9):31-32.

"Sprite Terminator User Guide," [online] Dec. 6, 2007, pp. 1-45, Retrieved from the Internet: URL: http://www.spritesoftware.com/getmedia/4d21ad24-fd62-4c5e-a4fe-15ebc9aac9a/SpriteTerminator.aspx> [retrieved on Jul. 9, 2010].

Ayatsuka et al., "UbiquitousLinks. Hypermedia Links Embedded in the Real World, Technical Report of Information Processing Society, 96-HI-67," Information Processing Society of Japan, Jul. 11, 1996, 96(62):23-30.

Nagao et al., Walk Navi: A Location-Aware Interactive Navigation/Guideline System and Software III, First edition, pp. 9-48, published by Kindai-Kagaku-Sya Co. Ltd., Dec. 10, 1995.

Benefon ESC! GSM+GPS Personal Navigation Phone, benefon.com, Copyright 2001, 4 pages.

Freundschuh, "Does 'Anybody' Really Want (or Need) Vehicle Navigation Aids?" First Vehicle Navigation and Information System Conference, Sep. 11-13, 1989, Toronto, Canada, 5 pages.

Gould, "The Provision of Usable Navigation Assistance: Considering Individual Cognitive Ability," First Vehicle Navigation and Information System Conference, Sep. 11-13, 1989, Toronto, Canada, 7 pages.

Mark, "A Conceptual Model for Vehicle Navigation Systems," First Vehicle Navigation and Information System Conference, Sep. 11-13, 1989, Toronto, Canada, 11 pages.

Wheeler et al., "Development of Human Factors Guidelines for Advanced Traveler Information Systems and Commercial Vehicle Operations: Task Analysis of ATIS/CVO Functions," US Dept. Transportation Federal Highway Administration Research and Development, Publication No. FHWA-RD-95-176, Nov. 1996, 124 pages.
Miller et al., "Integrating Hierarchical Navigation and Querying: A User Customizable Solution," ACM Multimedia Workshop on Effective Abstractions in Multimedia Layout, Presentation, and Interaction, San Francisco, CA, Nov. 1995, 8 pages.
Hoogenraad, "Location Dependent Services," 3rd AGILE Conference on Geographic Information Science, Helsinki/Espoo, Finland, May 25-27, 2000, pp. 74-77.
Bonsignore, "A Comparative Evaluation of the Benefits of Advanced Traveler Information System (ATIS) Operational Tests," MIT Masters Thesis, Feb. 1994, 140 pages.
Noonan and Shearer, "Intelligent Transportation Systems Field Operational Test Cross-Cutting Study Advance Traveler Information systems," Intelligent Transportation Systems Field Operational Test Cross-Cutting Study, Sep. 1998, 26 pages.
Burnett, "Usable Vehicle Navigation Systems: Are We There Yet?" Vehicle Electronic Systems 2000, Jun. 29-30, 2000, 3.1.1-3.1.12.
Khattak et al., "Bay Area ATIS Testbed Plan," Research Reports, California Partners for Advanced Transit and Highways (PATH), Institute of Transportation Studies, UC Berkeley, Jan. 1, 1992, 83 pages.
Yim et al., "Travinfo Field Operational Test: Work Plan for the Target, Network, and Value Added Reseller (VAR) Customer Studies," Working Papers, California Partners for Advanced Transit and Highways (PATH), Institute of Transportation Studies, UC Berkeley, Apr. 1, 1997, 49 pages.
Mahmassani et al., "Providing Advanced and Real-Time Travel/Traffic Information to Tourists," Center for Transportation Research, Bureau of Engineering Research, The University of Texas at Austin, Oct. 1998, 15 pages.
"New Handsets Strut Their Stuff At Wireless '99," Internet: URL: http://findarticles.com/p/articles/mi_m0BMD/is_1999_Feb_11/ai_n27547656/ downloaded from Internet on Feb. 11, 1999, 3 pages.
"School Buses to Carry Noticom's First Application," Internet: URL: http://findarticles.com/p/articles/mi_m0BMD/is_1999_Feb_17/ai_n27547754/ downloaded from the Internet on Feb. 17, 1999, 2 pages.
Green et al., "Suggested Human Factors Design Guidelines for Driver Information Systems," Technical Report UMTRI-93-21, Nov. 1993, 119 pages.
Tijerina et al., "Driver Workload Assessment of Route Guidance System Destination Entry While Driving: A Test Track Study," Proceedings of the 5th ITS World Congress, Oct. 12-16, 1998, Seoul, Korea, 9 pages.
Muraskin, "Two-Minute Warnings for School Bus Riders," Internet: URL: http://www.callcentermagazine.com/shared/printableArticle.jhtml ;jsessionid=PQH1SZXW... Jul. 1, 1999, 3 pages.
Ni and Deakin, "On-Board Advanced Traveler Information Systems," Dec. 1, 2002, 10 pages.
Serafin et al., "Functions and Features of Future Driver Information Systems," Technical Report UMTRI-91-16, May 1991, 104 pages.
Shekhar and Liu, "Genesis and Advanced Traveler Information Systems (ATIS): Killer Applications for Mobile Computing?" NSF Mobidata Workshop on Mobile and Wireless Information Systems, Nov. 1994, 20 pages.
"LaBarge in joint venture on bus system," Internet: URL: http://www.bizjournals.com/stlouis/stories/1998/08/10/focus2.html?t-printable, Aug. 7, 1998, 1 page.
Clarke et al., "Development of Human Factors Guidelines for Advanced Traveler Information Systems (ATIS) and Commercial Vehicle Operations (CVO): Comparable Systems Analysis," U.S. Department of Transportation Federal Highway Administration, Publication No. FHWA-RD-95-197, Dec. 1996, 212 pages.
Zubac and Strahonja, "Theory and Development of an Online Navigation System," 18th International Conference on Information and Intelligent Systems, University of Zagreb, Sep. 12-14, 2007.
Brown, "The stick-e document: a framework for creating context-aware applications," Electronic Publishing, 1995, 8:259-272.
Brown, "Triggering Information by Context," Personal Technologies, 1998, 2:18-27.
Dey et al., "CyberDesk: a framework for providing self-integrating context-aware services," Knowledge-Based Systems, 1998, 11:3-13.
Hodes and Katz, "Composable ad hoc location-based services for heterogeneous mobile clients," Wireless Networks, 1999, 5:411-427.
Kreller et al., "A Mobile-Aware City Guide Application," ACTS Mobile Communication Summit, 1998, Rhodes, Greece, 7 pages.
Lusky et al., "Mapping the Present," ColoradoBiz, Nov. 1999, 26(11):16-17.
McCarthy and Meidel, "ACTIVEMAP: A Visualization Tool for Location Awareness to Support Informal Interactions," HUC '99, LNCS 1707, 1999, pp. 158-170.
O'Grady et al., "A Tourist-Centric Mechanism for Interacting with the Environment," Proceedings of the First International Workshop on Managing Interactions in Smart Environments (MANSE '99), Dublin, Ireland, Dec. 1999, pp. 56-67.
Pascoe et al., "Developing Personal Technology for the Field," Personal Technologies, 1998, 2:28-36.
Tarumi et al., "Public Applications of SpaceTag and Their Impacts," Digital Cities, LNCS 1765, 2000, pp. 350-363.
Tebbutt, "Dial your way out of the woods," The Australian, Feb. 2000, 1 page.
Tso et al., "Always on, Always Connected Mobile Computing," Mobile Communications Operation—Mobile Handheld Products Group, 1996, pp. 918-924.
Wang and Lin, "Location Aware Information Agent over WAP," Tamkang Journal of Science and Engineering, 2000, 3(2):107-115.
"3rd Generation Partnership Project (3GPP); Technical Specification Group (TSG) RAN; Working Group 2 (WG2); Report on Location Services (LCS)," 3G TR 23.923 v.1.0.0, Apr. 1999, 45 pages.
"Report on Location Service feature (LCS) 25.923 v1.0.0," TSG-RAN Working Group 2 (Radio layer 2 and Radio layer 3), Berlin, May 25-28, 1999, 45 pages.
"3rd Generation Partnership Project; Technical Specification Group Services and System Aspects; Functional stage 2 description of location services in UMTS," 3G TS 23.171 v.1.1.0, Nov. 1999, 42 pages.
"3rd Generation Partnership Project; Technical Specification Group Radio Access Network; Stage 2 Functional Specification of Location Services in UTRAN," 3G TS 25.305 v.3.1.0, Mar. 2000, 45 pages.
"Enabling UMTS / Third Generation Services and Applications," No. 11 Report from the UMTS Forum, Oct. 2000, 72 pages.
"3rd Generation Partnership Project (3GPP); Technical Specification Group (TSG) RAN; Working Group 2 (WG2); Report on Location Services," TS RAN R2.03 V0.1.0, Apr. 1999, 43 pages.
"Revised CR to 09/31 on work item LCS," ETSI SMG3 Plenary Meeting #6, Nice, France, Dec. 13-15, 1999. 18 pages.
Digital cellular telecommunications system (Phase 2+); Location Services (LCS); Service description, Stage 1 (GSM 02.71) ETSI, Apr. 1999, 22 pages.
Akerblom, "Tracking Mobile Phones in Urban Areas," Goteborg University Thesis, Sep. 2000, 67 pages.
Borsodi, "Super Resolution of Discrete Arrivals in a Cellular Geolocation System," University of Calgary Thesis, Apr. 2000, 164 pages.
Abowd et al., "Context-awareness in wearable and ubiquitous computing," 1st International Symposium on Wearable Computers, Oct. 13-14, 1997, Cambridge, MA, 9 pages.
Balsiger et al., "MOGID: Mobile Geo-depended Information on Demand," Workshop on Position Dependent Information Services (W3C-WAP), 2000, 8 pages.
Cheverst et al., "Architectural Ideas for the Support of Adaptive Context-Aware Applications," Proceedings of Workshop on Infrastructure for Smart Devices—How to Make Ubiquity an Actuality, HUC'00, Bristol, Sep. 2000, 3 pages.
Cheverst et al., "The Role of Connectivity in Supporting Context-Sensitive Applications," HUC'99, LNCS 1707, 1999, pp. 193-209.
Efstratiou and Cheverst, "Reflection: A Solution for Highly Adaptive Mobile Systems," 2000 Workshop on Reflective Middleware, 2000, 2 pages.
Cheverst et al., "The Support of Mobile-Awareness in Collaborative Groupware," Personal Technologies, 1999, 3:33-42.
Cheverst et al., "Design of an Object Model for a Context Sensitive Tourist Guide," Computers and Graphics, 1999, 23(6):883-891.
Cheverst et al., "Developing Interfaces for Collaborative Mobile Systems," 1999, 15 pages.

Cheverst et al., "Experiences of Developing and Deploying a Context-Aware Tourist Guide: The Guide Project," 2000, pp. 20-31.
Cheverst et al., "Exploiting Context to Support Social Awareness and Social Navigation," SIGGROUP Bulleting Dec. 2000, 21(3):43-48.
Cheverst et al., "Services to Support Consistency in Mobile Collaborative Applications," Proc. 3rd International Workshop on Services in Distributed Networked Environments, 1996, 8 pages.
Cheverst et al., "Sharing (Location) Context to Facilitate Collaboration Between City Visitors," 2000, 8 pages.
Cheverst et al., "Supporting Collaboration in Mobile-aware Groupware," Workshop on Handheld CSCW, 1998, 6 pages.
Change Request for "U.S. specific Emergency Services requirements included as an informative annex," Nov. 29, 1999, 2 pages.
Costa et al., "Experiments with Reflective Middleware," Proceedings of the ECOOP'98 Workshop on Reflective Object-Oriented Programming and Systems, ECOOP'98 Workshop Reader, 1998, 13 pages.
Davies et al., "L2imbo: A distributed systems platform for mobile computing," Mobile Networks and Applications, 1998, 3:143-156.
Davies et al., "'Caches in the Air': Disseminating Tourist Information in the Guide System," Second IEEE Workshop on Mobile Computer Systems and Applications, Feb. 25-26, 1999, 9 pages.
Dix et al., "Exploiting Space and Location as a Design Framework for Interactive Mobile Systems," ACM Transactions on Computer-Human Interaction (TOCHI)—Special issue on human-computer interaction with mobile systems, 2000, 7(3):285-321.
Drane et al., "Positioning GSM Telephones," IEEE Communications Magazine, Apr. 1998, pp. 46-59.
Drane and Rizos, "Role of Positioning Systems in ITS," Positioning Systems in Intelligent Transportation Systems, Dec. 1997, pp. 312, 346-349.
Efstratiou et al., "Architectural Requirements for the Effective Support of Adaptive Mobile Applications," 2000, 12 pages.
"Estonian operator to launch world's first Network-based location services," Ericsson Press Release, Oct. 11, 1999, 2 pages.
Fischer et al., "System Performance Evaluation of Mobile Positioning Methods," IEEE, Aug. 2002, pp. 1962-1966.
Flinn and Satyanarayanan, "PowerScope: A Tool for Profiling the Energy Usage of Mobile Applications," Proc. WMCSA '99 Second IEEE Workshop on Mobile Computing Systems and Applications, Feb. 25-26, 1999, 9 pages.
French and Driscoll, "Location Technologies for ITS Emergency Notification and E911," Proc. 1996 National Technical Meeting of the Institute of Navigation, Jan. 22-24, 1996, pp. 355-359.
Friday et al., "Developing Adaptive Applications: the MOST Experience," J. Integrated Computer-Aided Engineering, 1999, pp. 143-157.
Gunnarsson et al., "Location Trial System for Mobile Phones," IEEE, 1998, pp. 2211-2216.
Jose and Davies, "Scalable and Flexible Location-Based Services for Ubiquitous Information Access," HUC'99, LNCS 1707, 1999, pp. 52-66.
Klinec and Nolz, "Nexus-Positioning and Communication Environment for Spatially Aware Applications," IAPRS, Amsterdam, 2000, 7 pages.
Kovacs et al., "Adaptive Mobile Access to Context-aware Services," Proc. ASAMA '99 Proc. First International Symposium on Agent Systems and Applications Third International Symposium on Mobile Agents, IEEE Computer Society Washington, DC, 1999, 12 pages.
Kreller et al., "UMTS: a Middleware Architecture and Mobile API/Approach," IEEE Personal Communications, Apr. 1998, pp. 32-38.
Kugler and Lechner, "Combined Use of GPS and LORAN-C in Integrated Navigation Systems," Fifth International Conference on Satellite Systems for Mobile Communications and Navigation, London, UK, May 13-15, 1996, pp. 199-207.
Kyriazakos et al., "Optimization of the Handover Algorithm based on the Position of the Mobile Terminals," Communications and Vehicular Technology, Oct. 2000, pp. 155-159.
Leonhardt and Magee, "Multi-Sensor Location Tracking," MOBICOM 98, Dallas, TX, pp. 203-214.
Leonhardt and Magee, "Towards a general location service for mobile environments," Proc. Third International Workshop on Services in Distributed and Networked Environments, Jun. 3-4, 1996, 8 pages.
Long et al., "Rapid Prototyping of Mobile Context-Aware Applications: the Cyberguide Case Study," MobiCom '96, 1996, 11 pages.
Yokote, "The Apertos Reflective Operating System: the Concept and Its Implementation," OOPSLA'92, pp. 414-434.
Popescu-Zeletin et al., "Applying Location-Aware Computing for Electronic Commerce: Mobile Guide," Proc. 5th Conference on Computer Communications, AFRICOM-CCDC'98,Oct. 20-22, 1998, 14 pages.
Zhao, "Mobile Phone Location Determination and Its Impact on Intelligent Transportation Systems," IEEE Transactions on Intelligent Transportation Systems, Mar. 2000, 1(1):55-64.
Microsoft Outlook 2003 User's Guide, http://opan.admin.ufl.edu/user_guides/outlook2003.htm. Aug. 2004, 17 pages.
"Error: could not find a contact with this e-mail address." Outlookbanter.com. Dec. 2006, 12 pages.
Authorized officer Dorothee Mulhausen, International Preliminary Report on Patentability in PCT/US2009/41298 mailed Nov. 25, 2010, 8 pages.

* cited by examiner

US 8,359,643 B2

GROUP FORMATION USING ANONYMOUS BROADCAST INFORMATION

TECHNICAL FIELD

This subject matter is generally related to data communications between electronic devices.

BACKGROUND

Social networking has revolutionized the way people communicate and share information with one another. Online social networks are communities of individuals who share interests and activities or who are interested in exploring the interests and activities of others. Many social network services are web-based and provide a collection of various ways for users to interact, such as chat, messaging, email, video, voice chat, file sharing, blogging and discussion groups. Social network websites typically provide tools and communication infrastructures for organizing and managing social networks.

During private or public events (e.g., concert, tradeshows, business meetings, weddings, rallies), a typical individual may have many brief contacts with individuals for which they would like to have further correspondence post event. With conventional social network websites, the individual would have to collect personal information from the contacts, manually create a social network on the social network website and invite the contacts to join. Some of the contacts, however, may not be registered with the social network website, and will have to register before joining the social network.

Modern wireless devices can operate in an ad hoc mode (e.g., Bluetooth personal area network (PAN) or piconet) which allows wireless devices within range of each other to discover and communicate in peer-to-peer fashion without involving central access points. The ad hoc network, however, only exists while the participating devices are in close proximity to each other. There is no facility for regenerating the network at a later time to allow users to continue discussions or exchange content. Users who wish to participate in a PAN have to manually configure their devices or adaptors to do so, which can be tedious and time consuming. The informal nature of ad hoc networks, coupled with the lack of a centralized and secure access points, makes ad hoc networks susceptible to snooping and other attacks.

SUMMARY

A number of devices co-located at a geographic location can broadcast and receive tokens. Tokens can be exchanged using a communication link having limited communication range. Tokens that are received by a device can be stored locally on the device and/or transmitted to a trusted service operating remotely on a network. In some implementations, the tokens can be stored with corresponding timestamps to assist a trusted service in matching the tokens with tokens provided by other devices. The trusted service can perform an analysis on the tokens and timestamps to identify devices that were co-located at the geographic location at a given contact time which can be determined by the timestamps. A group can be created based on results of the analysis. Users of the Group devices can be invited to join a group. User interfaces, filters and search engines can be provided to the users to enable users to search and manage groups. The groups can be used with various applications (e.g., calendars, address books, email, instant messaging) to provide additional content and services to the users. If the geographic location of the group at the contact time is known, then members of the group can be targeted to receive location-based services (LBS) and content.

DETAILED DESCRIPTION

System Overview

Figure 1:
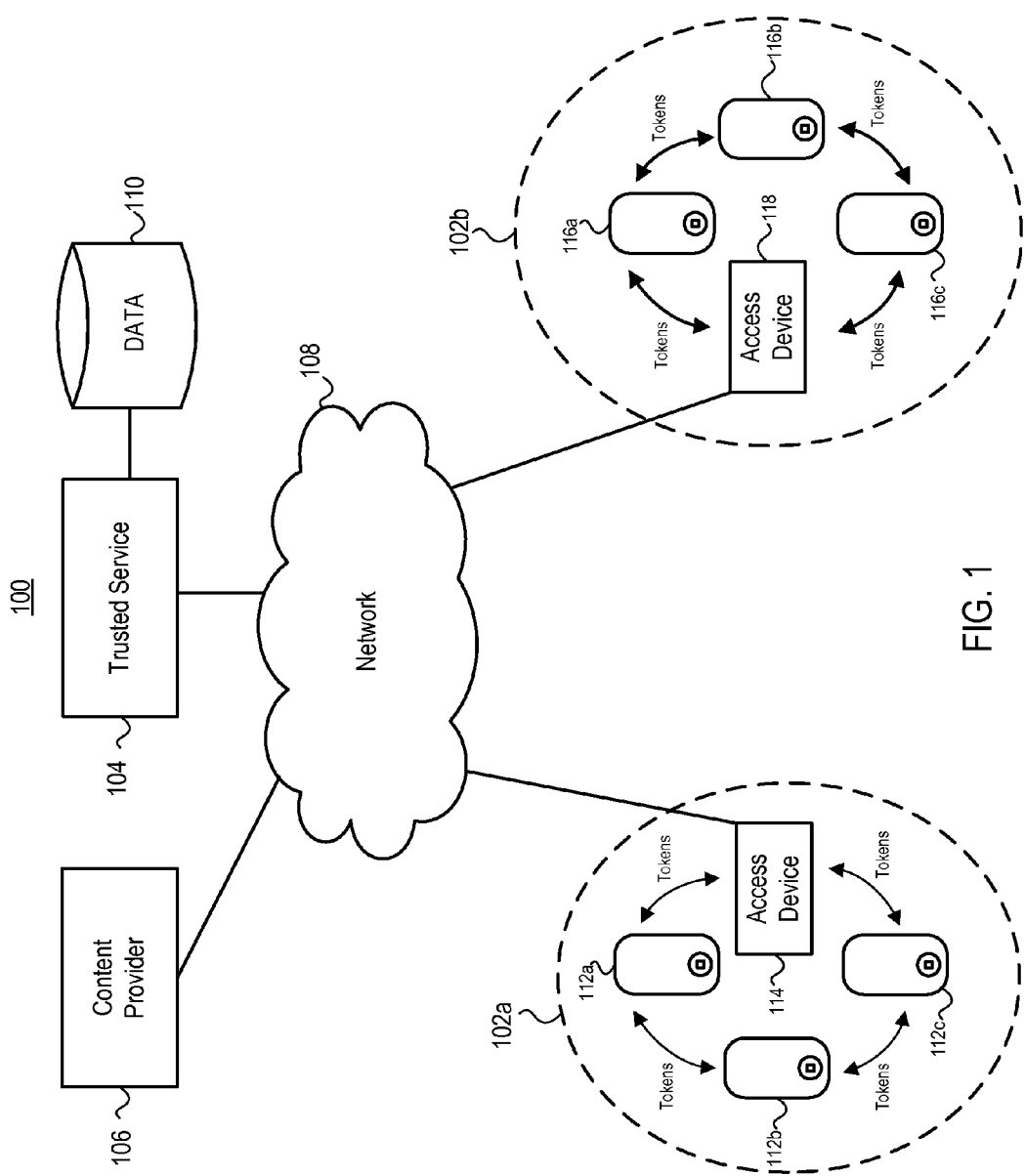
FIG. 1 illustrates an example system that allows group formation based on anonymous broadcast information.

FIG. 1 illustrates an example system 100 that allows group formation based on anonymous broadcast information. In some implementations, the system 100 generally includes one or more groups 102 coupled to a trusted service 104 through one or more networks 108 (e.g., the Internet, wireless network). In the example shown, the group 102a includes a set of devices 112a . . . 112c and the group 102b includes a set of devices 116a . . . 116c. The group 102a also includes an access device 114, for providing the devices 112 with access to the network 108. The group 102b includes an access device 118, for providing the devices 116 with access to the network 108.

The devices 112 can be any device capable of communicating with another device, including but not limited to: notebook computers, desktop computers, mobile phones, smart phones, email devices, set-top boxes, game consoles, personal digital assistants (PDAs), media players, digital cameras, video cameras, etc. The access devices 114, 118 can be any device capable of providing access to a network, including but not limited to: routers, hubs, interface cards, host computers and any one of the devices 112, 116 described above. One or more of the devices 112 can have access to the external network 108, either directly or indirectly through the access devices 114, 118. Internet Protocol (e.g., IPv4) can be used for external communication with network resources, such as the trusted service 104 and one or more content providers 106.

In some implementations, the devices 112, 116 in group 102a can exchange tokens while within transmission range of each other. The access devices 114, 118 can also exchange tokens with the devices 112, 116, respectively. For example, the device 112a can exchange tokens with devices 112b and 112c, as well as access device 114. Similarly, the device 112b can exchange tokens with devices 112a and 112c, as well as access device 114. The device 112c can exchange tokens with the devices 112a and 112b, as well as the access device 114.

The access device 114 can exchange tokens with any of the devices 112a, 112b and 112c. The devices 116 and access device 118 in group 102b have similar capabilities and need not be described here.

The system 100 can include any number of groups, and each group can include any number of devices and access devices. In some implementations, a group does not have a dedicated access device 114, 118. In such an implementation, any one or more of the devices 112, 116 can function as an access device for other devices in the group. A groups is defined as one or more devices that are in transmission range of each other for a period of time, referred to as a "contact time." A contact time can occur during private or public events or meetings. For example, members of a group can include attendees at a concert or sporting event, attendees at a business meeting, attendees at a tradeshow, attendees at an event or party, etc.

A token is a snippet or chunk of data that can be broadcast by a device to other devices that are within the transmission range of the broadcasting device. Tokens can be matched or otherwise correlated with other tokens by the trusted service 104, as will be described in reference to FIG. 2. In some implementations, a token can be a cryptographic key generated by a cipher running on the broadcasting device. Some examples of ciphers include but are not limited to: block ciphers, stream ciphers, symmetric key algorithms (e.g., triple-DES, AES), etc. Tokens are anonymous in that one cannot use a token to identify a particular device or its user/owner. Tokens can be rotated or changed periodically to prevent the tokens from being tracked by other devices, and the devices being subjected to frequency or pattern attacks. In some implementations, users can regain their anonymity by simply changing the cryptographic keys for their token generator.

In some implementations, the devices 112, 116 can use the same non-unique identifier (e.g., the same MAC address) for anonymous broadcasts. The non-unique identifier can be provided by the trusted service, for example. In some implementations, the tokens can be anonymously broadcasted using Bluetooth technology. For example, a data payload containing a non-unique identifier can be included in the Bluetooth discovery beacon of a broadcasting device. The discovery beacon includes a class/type field that can be filtered against, such that non-social devices will automatically discard received tokens. To maintain anonymity, a response message to the discovery beacon can use a fixed dummy MAC address to disguise its identity. Recognizing the dummy MAC address, the devices 112, 116 can interpret the payload as a token instead of a normal response to a discovery beacon.

Using Bluetooth protocol, a group of devices within transmission range of each other can exchange and store tokens without establishing a realtime communication link. This can be implemented, for example, by overloading data in discovery beacons, inquiry scan requests or extended inquiry scan requests. The non-unique identifier could be transmitted using these methods and not just using the discovery beacon. The size or membership of a group can be defined by the transmission range provided by the communication technology employed. For example, Bluetooth technology can provide a transmission range of about 10 meters (30 feet). To reduce the amount of tokens that are stored by a given device, a filter can be implemented on the receiving device to allow every nth token to be stored. Alternatively, or in addition to filters, the repetition rate for broadcasting tokens can be reduced on the broadcasting device. In some implementations, a detected token is stored once and each successive detection of the same token results in a counter being incremented. Thus, each token can be associated with a count in addition to a timestamp. If a token has a high count, then one can presumed that the device associated with the high-count token was in proximity with the receiving device for a longer period of time then other devices. Thus, token counts can be used to generate a score that indicates a level of quality of the contact which can be used for organizing and managing Groups.

In some implementations, the user can set a count threshold so that only tokens having counts that exceed a predetermined threshold are stored. Such a feature would have the affect of reducing the membership of a group by eliminating devices that only briefly entered the transmission range of a Group during a contact event and whose users would likely not want to be a member of the Group.

In some implementations, cache memory on the device can be used to store tokens and token metadata (e.g., timestamps, location information). When the cache becomes full, the cache contents can be uploaded to the trusted service 104, as described in reference to FIG. 3B. The uploading of tokens and token metadata to the trusted service 104 can be performed automatically or manually in response to a trigger event or on a scheduled basis. Some examples of trigger events can include but are not limited to: token storage capacity falling below a threshold value, power falling below a threshold value, device activation, syncing of the device with a host device, failure to receive tokens within a predetermined time window, user interaction with the device, etc. In some implementations, the token metadata can include device clock parameters that the trusted service 104 can use to synchronize timestamps from multiple devices in a Group.

To further explain the concept of token exchange, a scenario at rock concert will now be described. In this example scenario, a number of attendees of a rock concert set their Bluetooth-enabled devices to Token Exchange mode. All devices within transmission range of each other at the concert and that are set in Token Exchange mode begin exchanging and storing tokens. These devices are collectively referred to as a Group, and the users associated with devices in the Group are referred to as Group members. The Token Exchange is referred to as a "contact event." The contact event can be associated with a "contact time" defined by timestamps provided to the trusted service.

Either during the concert or sometime thereafter, each of the members upload their collected tokens to the trusted service 104. The trusted service can be a trusted third party that maintains a secure database 110 of device data, member data and encryption keys and/or other secret data. The database 110 includes additional information and data that can be used by the trusted service 104 to form Groups based on tokens, as described in reference to FIG. 2. Members can set up accounts with the trusted service 104 using secure communication channels. For example, a member can subscribe to a service by signing up through a website or portal operated by the trusted service 104. Personal information and secret data can be provided by the member to the trusted service 104 through the secure website or portal. More traditional communication channels can also be used, such as a postal service or telephone service. In some implementations, the devices uploading tokens and the trusted service communicate using symmetric key encryption. The trusted service is therefore "trusted" to have the appropriate keys for associating token sets with devices and/or users. Other encryption and authentication schemes (e.g., asymmetric key encryption, message digests, authentication, elliptic encryption, digital signatures) can also be used for secure communication between devices and the trusted service.

A key feature of the "rock concert" example described above is that a trusted service can infer the members of a group by collecting tokens from a few devices at the concert. For example, the musician's devices can exchange tokens with devices operated by users in the front row of the stadium. The front row devices can then exchange tokens with devices behind the front row, etc. Thus, token exchanges can occur in a "daisy chain" manner starting from one or more initiating devices. In this example, the musician's devices would be the group "anchor" that defines the "group." The "anchor" devices can be strategically placed around the stadium and used to triangulate the location of the users in the stadium based on their respective distances from the "anchor" devices. Since there is often enough physical separation between concertgoer devices and devices outside the stadium that the trusted service 104 can determine which devices are contained in the stadium using short-range communication technology (e.g., Bluetooth technology, Wi-Fi). In some implementations, the "anchor devices" can be access devices 114, 118.

In some implementations, additional token metadata can be generated, such as the current location of a token receiving device. For example, the token receiving device can record the time and its current position when each token is received. The token metadata can be used by the trusted service 104, for example, to further disambiguate tokens and provide a "virtual GPS" capability to devices that do not include or have access to positioning technologies.

Based on memory/storage capabilities of various devices during group formation, some devices can cache tokens to be relayed to new members of the group. The relayed tokens allow the new members to join the group without the new members being present at the Token Exchange or contact event.

Example Token Generation

An example token generation process will now be described. Let,
T=Token to be generated for a given user at a given time;
R=Token rotation period (e.g., change token every 5 minutes);
N=Current time ("now") rounded down to the nearest R (e.g., if R=5 minutes, then 1:13 PM is rounded down to 1:10 PM);
K=User's secret "key" for generating a unique sequence of tokens; and
h(x)=A cryptographically strong one-way hashing algorithm with input "x".
Let T be defined as $$T=f(K|N).$$ [1]

The token T can be the hash of the key and time concatenated ("|" means concatenation). The token T can be transmitted repeatedly for the rotation period R. Suppose there are two devices A, B whose clocks are out of sync. For the sake of simplicity, time will be measured from device A's perspective and device B's clock is 7 minutes faster than device A's clock. In this example scenario, device B computes a token:

$$T_b=f(K_b|N_b)$$ [2]

When device A receives a token, device A determines if the token is from a known device (e.g., a friend's device). In this example, assuming that device A suspects that the token is from device B and that device A has device B's secret key, then device A can compute its own token:

$$T_a=f(K_a|N_a)$$ [3]

In this scenario, $T_a$ does not match $T_b$ since the current time, $N_a$, for device A is 7 minutes behind the current time, $N_b$, for device B.

To sync tokens from devices A and B, in some implementations, device A can compute $T_{b-1}$, $T_b$ and $T_{b+1}$. Device A can then determine that $T_{b+1}$ matches the received token $T_b$. Device A can record that the token $T_b$ of device B is 1 rotation period R ahead of the token $T_a$ of device A. Device A can apply the same offset (e.g., 1 rotation period R) for subsequent tokens it receives from device B.

In some implementations, device A can tag the received the token received from device B with device A's local time. When device A uploads its tokens to the trusted service, device A can also include the local time. The trusted service (which has an accurate sense of time) can compute the difference between device A's clock and a reference clock. The same process can be performed for device B's tokens uploaded to the trusted service. If device A and/or device B changes their local time between token uploads to the trusted service, the devices A and B can include in their respective token uploads an indicator that a local time change has occurred. The trusted service can use this indicator to normalize or correct the token time-stamps. For example, the device A or device B can upload a difference between old and new local times, or the trusted service can compute the difference by logging local times.

In some implementations, device A can suspect a particular token belongs to device B if the token was broken down into "fast" and "slow" changing components. The slow component can be a code that is n-bits long (e.g., 4-bits). If the first n-bits of the code change at a slower rate (e.g., every hour), then device A can re-compute the slow code for device B and use the slow code as a hash to reduce the number of full f(x) computations. To ensure anonymity, however, the slow code can be sized to prevent the user of device A from being tracked by the slow code alone.

Example Trusted Service Process

Figure 2:
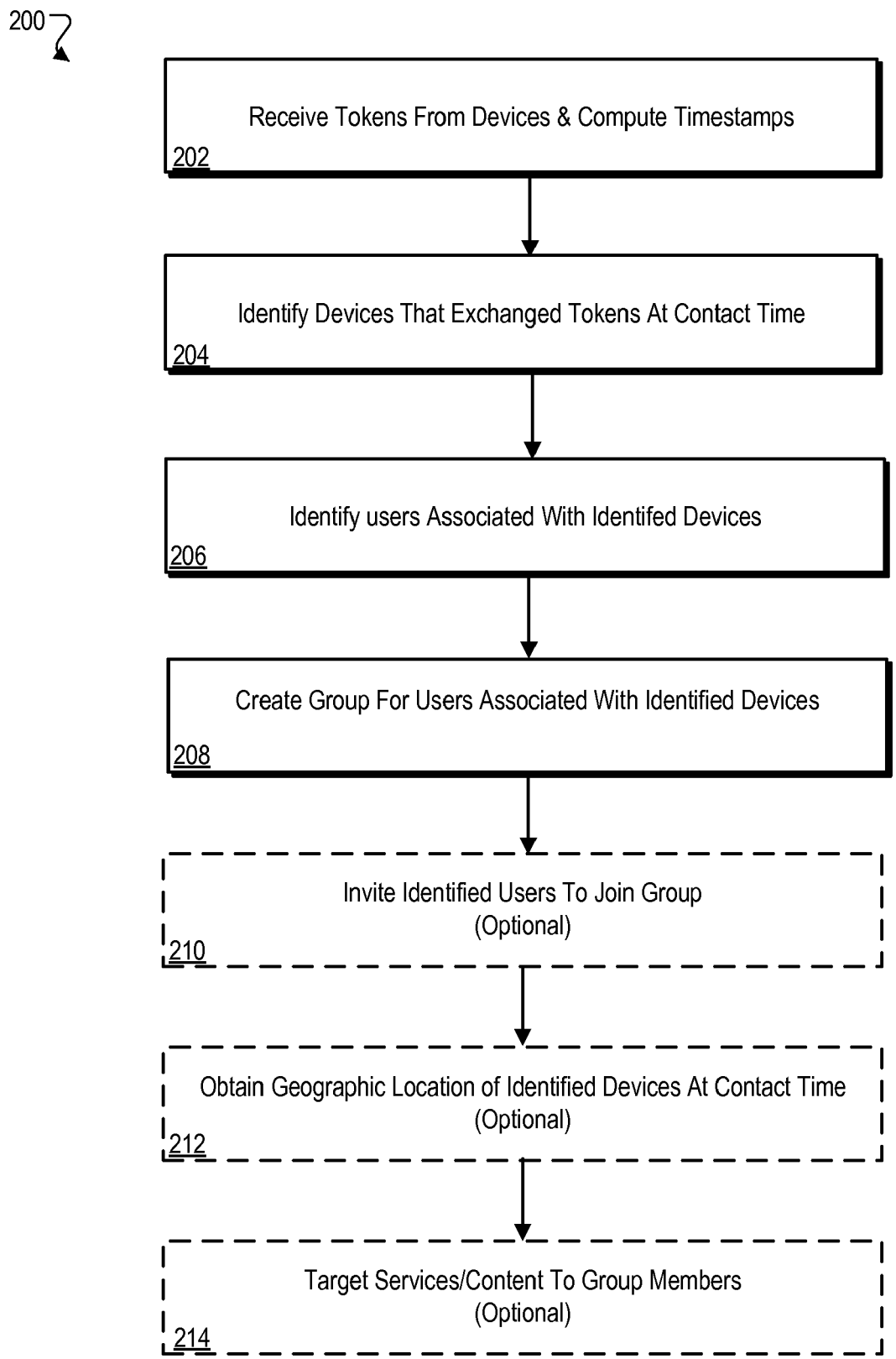
FIG. 2 is a flow diagram of an example process performed by a trusted service to form groups.

FIG. 2 is a flow diagram of an example process 200 performed by a trusted service (e.g., trusted service 104) to form Groups. In some implementations, the process 200 begins when the trusted service receives tokens from devices and computes timestamps to indicate when the tokens were received by the device (202). Tokens can be received directly from devices in the Groups during a contact event or from an access device in the Group (e.g., access device 114). The tokens can be received periodically from devices or in response to trigger events. The trusted service can store the tokens in an indexed database (e.g., database 110). The tokens can be organized into token repositories that are associated with the individual devices that collected the tokens. For example, devices 112a, 112b and 112c can each have a token repository in the database. The token repositories can be associated with devices 112a, 112b, 112c, using identifying information in the form of one or more device identifiers (e.g., MSID, DID, ICCID, IMSI, SIM, USIM). Each time a device uploads a new batch of tokens, the trusted service stores those tokens in the token repository associated with the device identifier(s). The trusted service can periodically run maintenance processes on the token repositories. For example, the trusted service can delete tokens based on their age or other criteria which can be user definable.

After the token repositories are populated with tokens, the trusted service can identify Groups of devices that have exchanged tokens at a contact time (204). In some implementations, the trusted service analyzes token repositories for a specified time window based on the timestamps to define a "token set." In some implementations, the timestamps can be synchronized using a symmetric cipher as a pseudo random number generator (PRNG). If a device generates symmetric keys that rotate every x minutes, then x/2 minutes of clock drift can be tolerated. For example, a rotation period of one minute would tolerate 30 seconds of drift. A symmetric cipher based on a PRNG can be used to compute tokens before and after the current token. These tokens can allow the device to adjust for larger clock mismatches. A clock offset of given device can be determined by comparing (e.g., differencing) the device clock with a reference clock operated by the trusted service 104 (e.g., a server clock). The comparison can occur when the device uploads tokens to the trusted service 104. The device clock can be transmitted with the tokens, assuming the latency of the upload channel is low. Once a device's clock offset from realtime is known, the token time-stamps associated with the device can be adjusted using the clock offset. In some implementations, token metadata can be generated indicating if the user has changed their clock. This feature ensures that the user cannot program a fake time to fool the trusted service 104.

In some implementations, the analysis performed by the trusted service includes matching tokens sets. For example, two token sets with large numbers of matching tokens can be a strong indication that those devices were within transmission range of each other at a contact time in the past and exchanged tokens. Such devices can be tagged by the trusted service as belonging to a Group. The Group can be given a unique identifier to facilitate further processing by the trusted service.

Figure 5A:
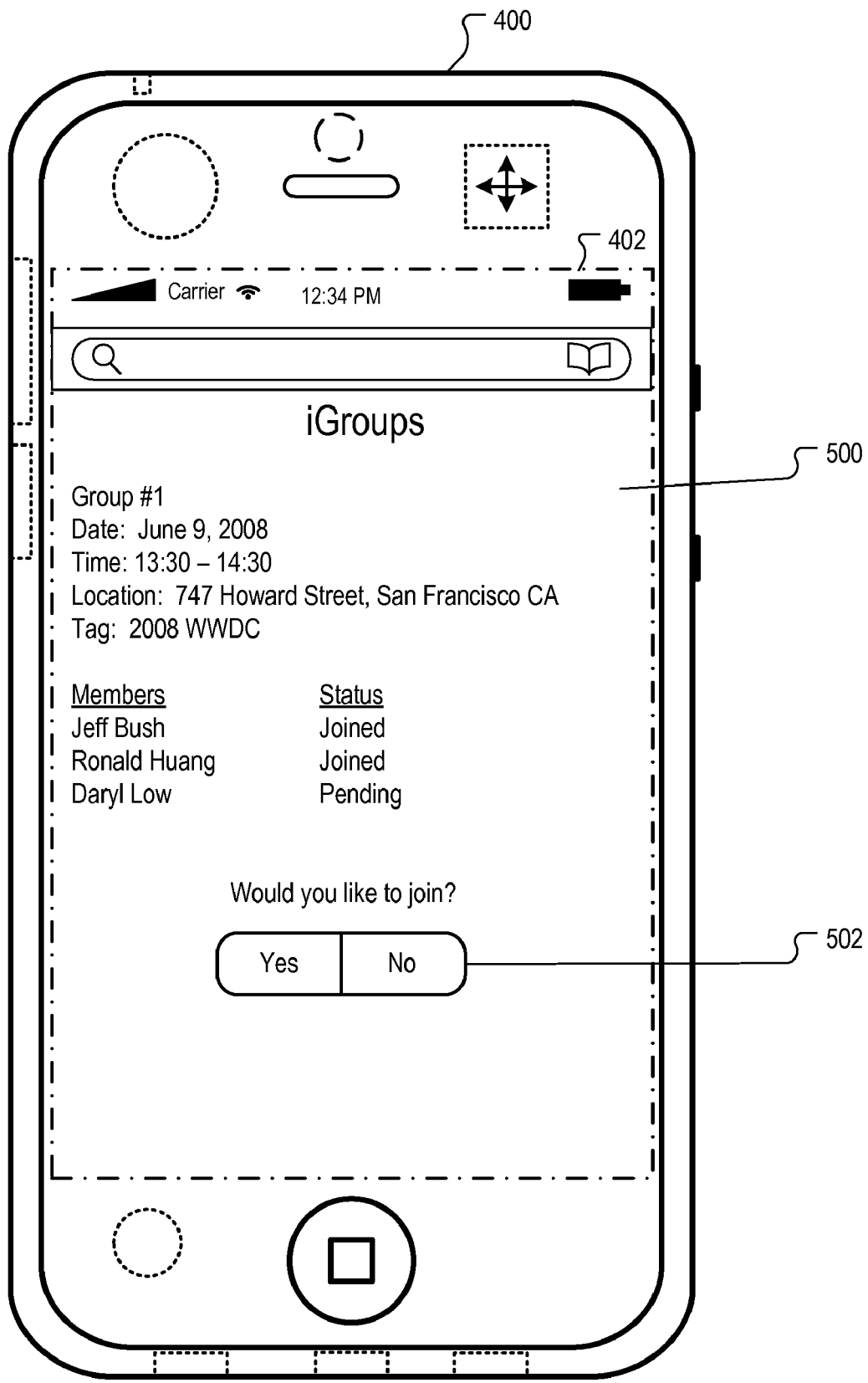
FIG. 5A illustrates an example user interface for allowing a user to join a group formed in accordance with the process of FIG. 2.

In some implementations, a score can be computed based on the number of successful matches. The score can be used to order a list of Groups for a particular user, so that the Group with the highest score is displayed at the top of a Group list presented to the user, as is shown in FIG. 5A.

Once a Group of devices has been identified, users associated with the identified devices can also be identified using member data stored in the database (206), and a Group can be created for the users (208). In some implementations, the Group can be a social network and the trusted service can optionally invite the users to join the Group (210). The invitation can be displayed on a graphical user interface of the device, as described in reference to FIGS. 5A and 5B. A geographic location of identified devices at a contact time can be obtained (212). The trusted service can receive location information from one or more of the devices or an access device. In some implementations, when a member joins a Group, the location can be used to target members with location-based services or content (214) (e.g., coupons, advertisements). The content can be provided by the trusted service or a content provider (e.g., the content provider 106).

In some implementations, a device (e.g., an access device 114) can also provide a geographic location (e.g., position coordinates) to the trusted service. With the geographic information the location of the Group during the time window is known and the members of the Group can be targeted with location-based services. Referring to the previous concert example, the concert attendees in a Group can be sent coupons to purchase music or other items related to the concert or invited to join a fan club of the performer, etc.

In another example, several people could meet and exchange tokens at a coffee shop. The coffee shop has an access device (e.g., a Wi-Fi router) that is capable of broadcasting and receiving tokens. The access device can send to the trusted service the tokens collected from the devices and the location of the access device. The location information allows the trusted service to determine the location of the Group during the time window and provide location-based services. For example, coupons for free coffee can be sent to the Group members.

Example Device Processes

Figure 3A:
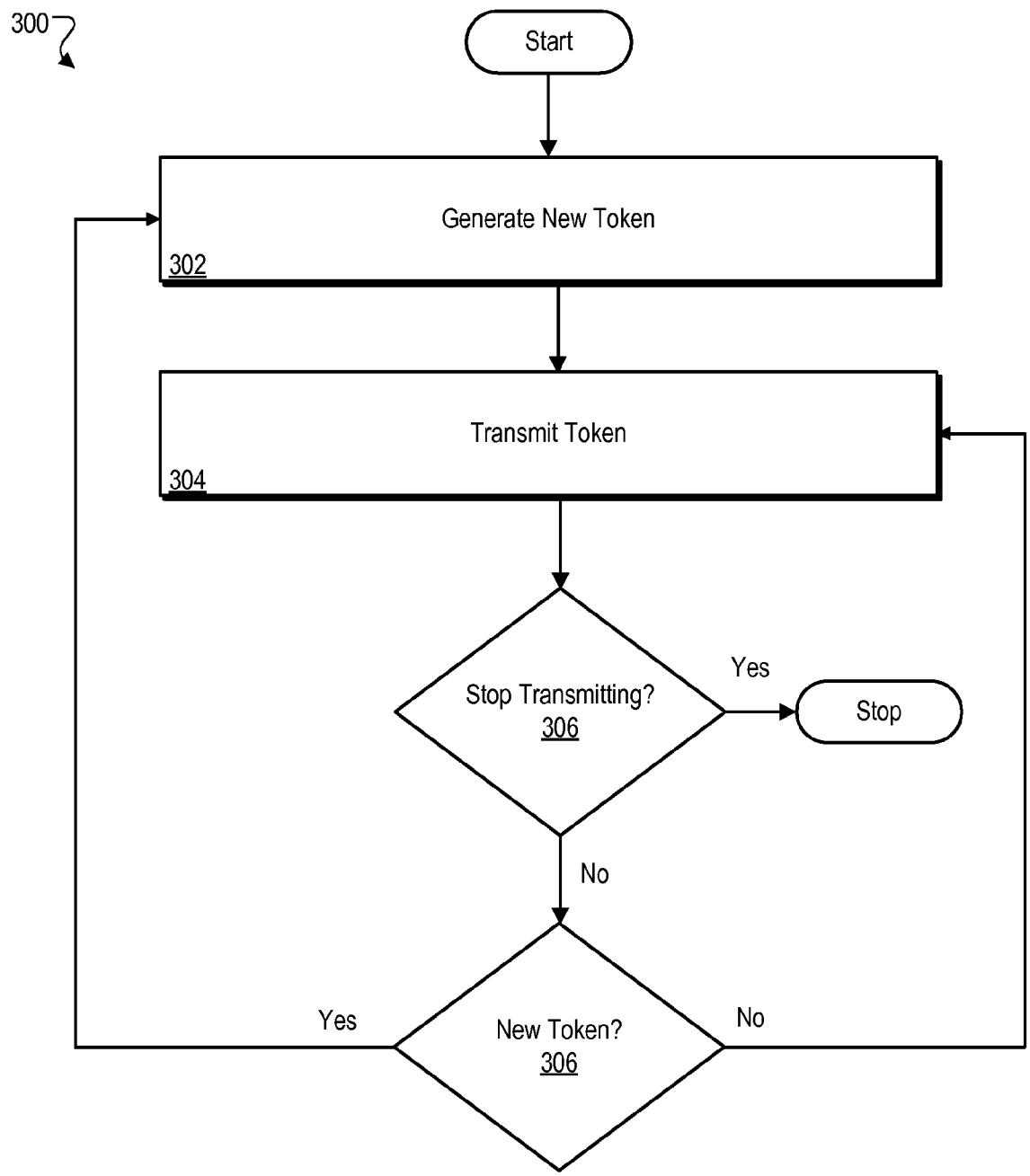
FIG. 3A is a flow diagram of an example process performed by a device for broadcasting tokens to other devices.

FIG. 3A is a flow diagram of an example process 300 performed by a device for broadcasting tokens to other devices. In some implementations, the process 300 begins when the device generates a new token (302). If Bluetooth technology is used, this can occur when the user sets their device into an Inquiry state. The token is broadcast to other devices (304) until commanded (e.g., by a device processor) to stop transmitting (306). Periodically, a command can be issued to generate a new token (306) and the process repeats step 302. The new token can be generated to prevent hackers from performing frequency or pattern analysis attacks on devices during contact events. Devices that are set in Inquiry Scan state can receive the tokens. The transmission range of the tokens is based on the communication technology used.

Figure 3B:
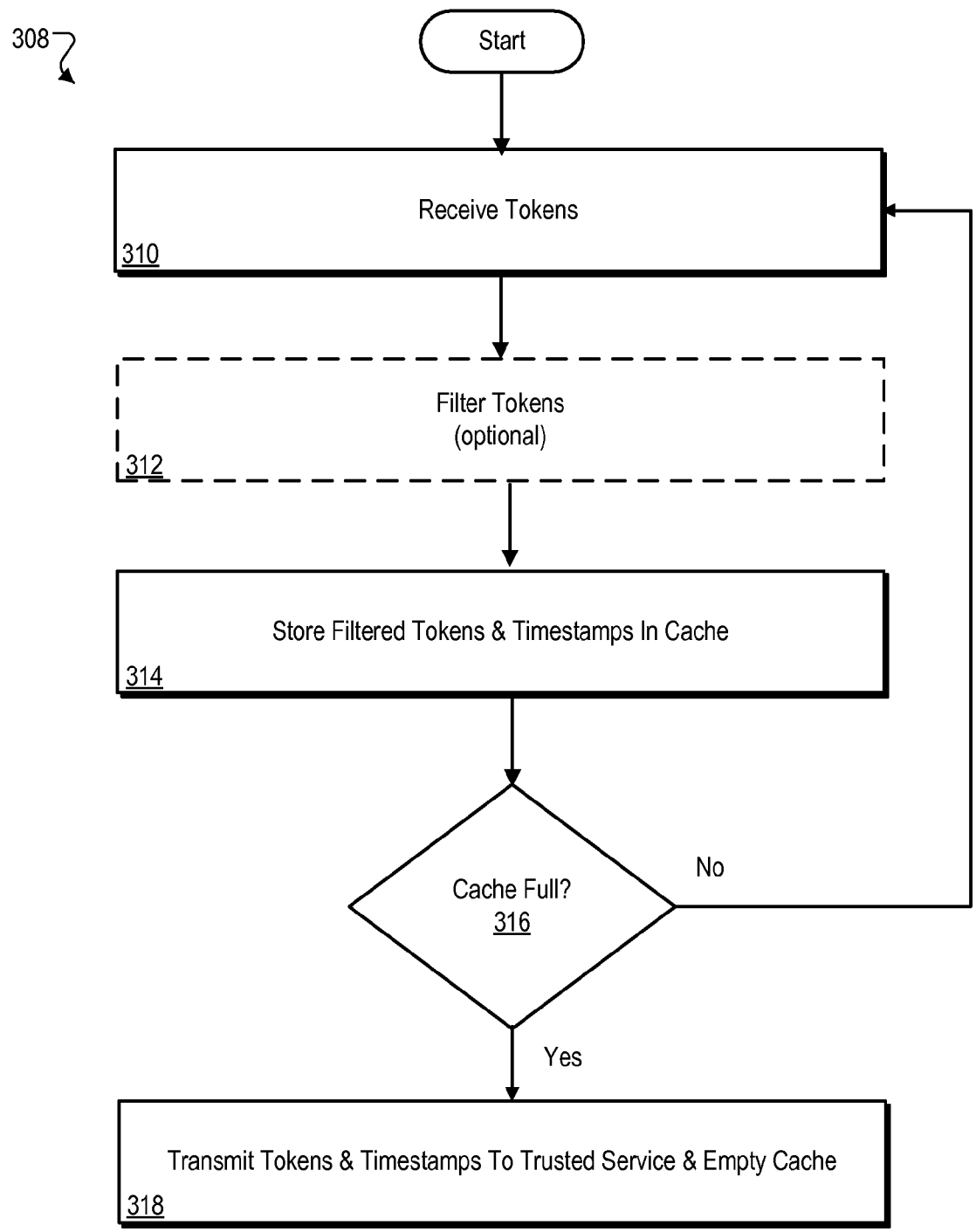
FIG. 3B is a flow diagram of an example process performed by a device for receiving tokens broadcasted by other devices.

FIG. 3B is a flow diagram of an example process 308 performed by a device (including an access device) for receiving tokens broadcasted by other devices during a contact event. In some implementations, the process 300 begins when the device receives tokens from other devices (310). The device can optionally filter the tokens to reduce their number (312). For example, the device can filter out every x token received from a given broadcasting device. Alternatively, filters can be applied to eliminate spurious tokens from passing devices based on toke counts. For example, a rule can be implemented by the receiving device that a token from a given device will only be stored if it is received n times within a predetermined receive window of time. The tokens that pass the filters are stored on the device (314). For example, a cache memory can be reserved on the device for storing tokens. Tokens can persist on the device by storing in non-volatile memory (e.g., a hard disk, flash memory). If the cache is full (316), the device can transmit the tokens and corresponding timestamps to a trusted service and empty the cache (318).

A timestamp can be generated by the receiving device for each token received using an internal clock of the device or a received clock (e.g., a GPS clock, Internet Time Service (ITS), network clock using Network Time Protocol (NTP)). In some implementations, the device may receive additional information from other devices, such as messages for use in computing time offsets. The tokens, timestamps and additional information, if any, can be compressed prior to being sent to the trusted service using any suitable compression technique (e.g., LZW). If the device is location aware, then geographic location information can also be transmitted to the trusted service for use in providing location-based services or content.

Example Mobile Device

Figure 4:
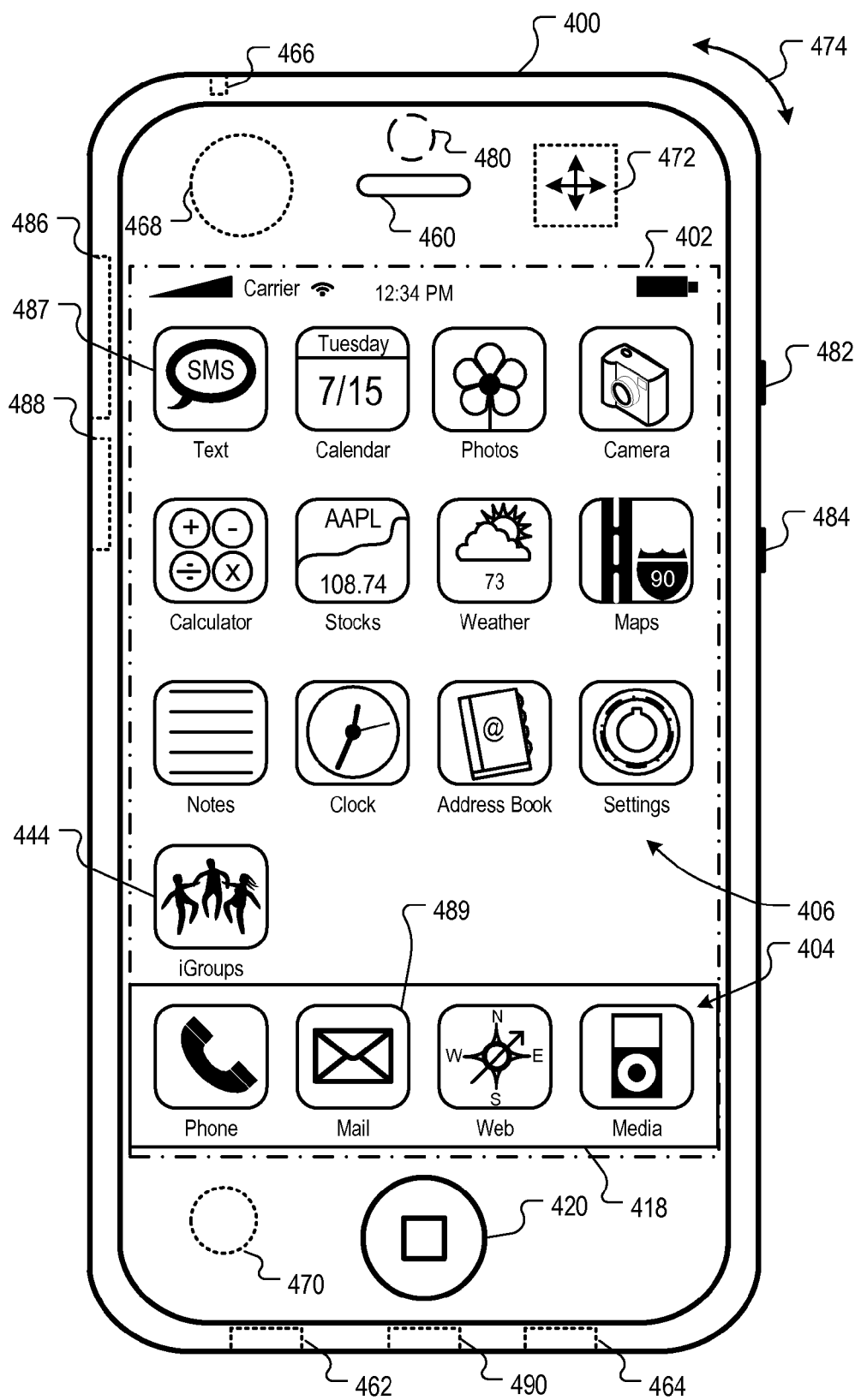
FIG. 4 illustrates an example home screen of a mobile device that performs the processes of FIGS. 3A and 3B.

FIG. 4 is a block diagram of an example mobile device 400. The mobile device 400 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 400 includes a touch-sensitive display 402 or pad. The touch-sensitive display 402 can implement liquid crystal display (LCD) technology, light emitting polymer display (LPD) technology, or some other display technology. The touch sensitive display 402 can be sensitive to haptic and/or tactile contact with a user.

In some implementations, the touch-sensitive display 402 can comprise a multi-touch-sensitive display 402. A multi-touch-sensitive display 402 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 400 can display one or more graphical user interfaces on the touch-sensitive display 402 for providing the user access to various system objects and for conveying information to the user. In some implementations, the graphical user interface can include one or more display objects 404, 406. In the example shown, the display objects 404, 406, are graphic representations of system objects. Some examples of system objects include device functions, applications, windows, files, alerts, events, or other identifiable system objects.

In some implementations, the mobile device 400 can implement multiple device functionalities, such as a telephony device, an e-mail device, a network data communication device, a Wi-Fi base station device and a media processing device. In some implementations, particular display objects 404 can be displayed in a menu bar 418. In some implementations, device functionalities can be accessed from a top-level graphical user interface ("home screen"), such as the graphical user interface illustrated in FIG. 4. Touching one of the display objects 404 can, for example, invoke corresponding functionality. For example, touching the display object 489 would invoke an email application on the mobile device 400 for sending text and geographic location data files.

In some implementations, the mobile device 400 can implement network distribution functionality. For example, the functionality can enable the user to take the mobile device 400 and provide access to its associated network while traveling. In particular, the mobile device 400 can extend Internet access (e.g., Wi-Fi) to other wireless devices in the vicinity. For example, mobile device 400 can be configured as a base station for one or more devices. As such, mobile device 400 can grant or deny network access to other wireless devices.

In some implementations, upon invocation of device functionality, the graphical user interface of the mobile device 400 changes, or is augmented or replaced with another user interface or user interface elements, to facilitate user access to particular functions associated with the corresponding device functionality. For example, in response to a user touching a phone object, the graphical user interface of the touch-sensitive display 402 may present display objects related to various phone functions; likewise, touching of an email object may cause the graphical user interface to present display objects related to various e-mail functions; touching a Web object may cause the graphical user interface to present display objects related to various Web-surfing functions; and touching a media player object may cause the graphical user interface to present display objects related to various media processing functions.

In some implementations, the top-level graphical user interface environment or state of FIG. 4 can be restored by pressing a button 420 located near the bottom of the mobile device 400. In some implementations, each corresponding device functionality may have corresponding "home" display objects displayed on the touch-sensitive display 402, and the top-level graphical user interface environment of FIG. 4 can be restored by pressing the "home" display object.

In some implementations, the top-level graphical user interface can include additional display objects 406, such as a short messaging service (SMS) object, a calendar object, a photos object, a camera object, a calculator object, a stocks object, a weather object, a maps object, a notes object, a clock object, an address book object, a settings object. In the example shown, a display object 444 can be touched to invoke the user interface shown in FIG. 5A.

Additional and/or different display objects can also be displayed in the graphical user interface of FIG. 4. For example, if the device 400 is functioning as a base station (e.g., an access point 114) for other devices, one or more "connection" objects may appear in the graphical user interface to indicate the connection. In some implementations, the display objects 406 can be configured by a user, e.g., a user may specify which display objects 406 are displayed, and/or may download additional applications or other software that provides other functionalities and corresponding display objects.

In some implementations, the mobile device 400 can include one or more input/output (I/O) devices and/or sensor devices. For example, a speaker 460 and a microphone 462 can be included to facilitate voice-enabled functionalities, such as phone and voice mail functions. In some implementations, an up/down button 484 for volume control of the speaker 460 and the microphone 462 can be included. The mobile device 400 can also include an on/off button 482 for a ring indicator of incoming phone calls. In some implementations, a loud speaker 464 can be included to facilitate hands-free voice functionalities, such as speaker phone functions. An audio jack 466 can also be included for use of headphones and/or a microphone.

In some implementations, a proximity sensor 468 can be included to facilitate the detection of the user positioning the mobile device 400 proximate to the user's ear and, in response, to disengage the touch-sensitive display 402 to prevent accidental function invocations. In some implementations, the touch-sensitive display 402 can be turned off to conserve additional power when the mobile device 400 is proximate to the user's ear.

Other sensors can also be used. For example, in some implementations, an ambient light sensor 470 can be utilized to facilitate adjusting the brightness of the touch-sensitive display 402. In some implementations, an accelerometer 472 can be utilized to detect movement of the mobile device 400, as indicated by the directional arrow 474. Accordingly, display objects and/or media can be presented according to a detected orientation, e.g., portrait or landscape. In some implementations, the mobile device 400 may include circuitry and sensors for supporting a location determining capability, such as that provided by the Global Positioning System (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 400 or provided as a separate device that can be coupled to the mobile device 400 through an interface (e.g., port device 490) to provide access to location-based services.

In some implementations, the port device 490, e.g., a Universal Serial Bus (USB) port, or a docking port, or some other wired port connection, can be included. The port device 490 can, for example, be utilized to establish a wired connection to other computing devices, such as other communication devices 400, network access devices, a personal computer, a printer, a display screen, or other processing devices capable of receiving and/or transmitting data. In some implementations, the port device 490 allows the mobile device 400 to synchronize with a host device using one or more protocols, such as, for example, the TCP/IP, HTTP, UDP and any other known protocol.

The mobile device 400 can also include a camera lens and sensor 480. In some implementations, the camera lens and sensor 480 can be located on the back surface of the mobile device 400. The camera can capture still images and/or video.

The mobile device 400 can also include one or more wireless communication subsystems, such as an 802.11b/g communication device 486, and/or a Bluetooth™ communication device 488. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Group User Interfaces

FIG. 5A illustrates an example user interface for allowing a user to join a group formed in accordance with the process 200 of FIG. 2. In some implementations, when the user touches the display object 444 ("iGroups"), the user interface 500 is displayed on the touch-sensitive display 402. The user interface 500 invites a user to join a Group formed by the trusted service 104, as described in reference to FIG. 2. A user interface element 502 (e.g., a button) is provided for joining. An option to join later (not shown) can also be presented to the user. Other user interface elements can be included for moving to previous pages, exiting the user interface, etc.

In the example shown, the trusted service formed a Group #1 which includes identified users Jeff Bush, Donald Huang and Daryl Low. The Group was based on a contact that occurred on Jun. 9, 2008, at 747 Howard Street, San Francisco, Calif. In this example, the mobile device 400 belongs to Daryl Low who is being invited to join the Group #1. Under a Status column, the device indicates that Jeff Bush, Donald Huang have joined the Group. Daryl Low is listed as "pending" since he has not yet joined. Also displayed is a tag field which includes the name "2008 WWDC." A personal "tag" can be provided by each of the Group members and changed later by that member. The tags facilitate searching a database of Groups stored at the trusted service 104 or locally on the device 400, as described in reference to FIG. 5B.

The user interface 500 is one example of possible user interface design. Other designs are possible, including designs with more or fewer user interface elements (e.g., including animated elements and transitions) and which convey more or less information to the user.

Figure 5B:
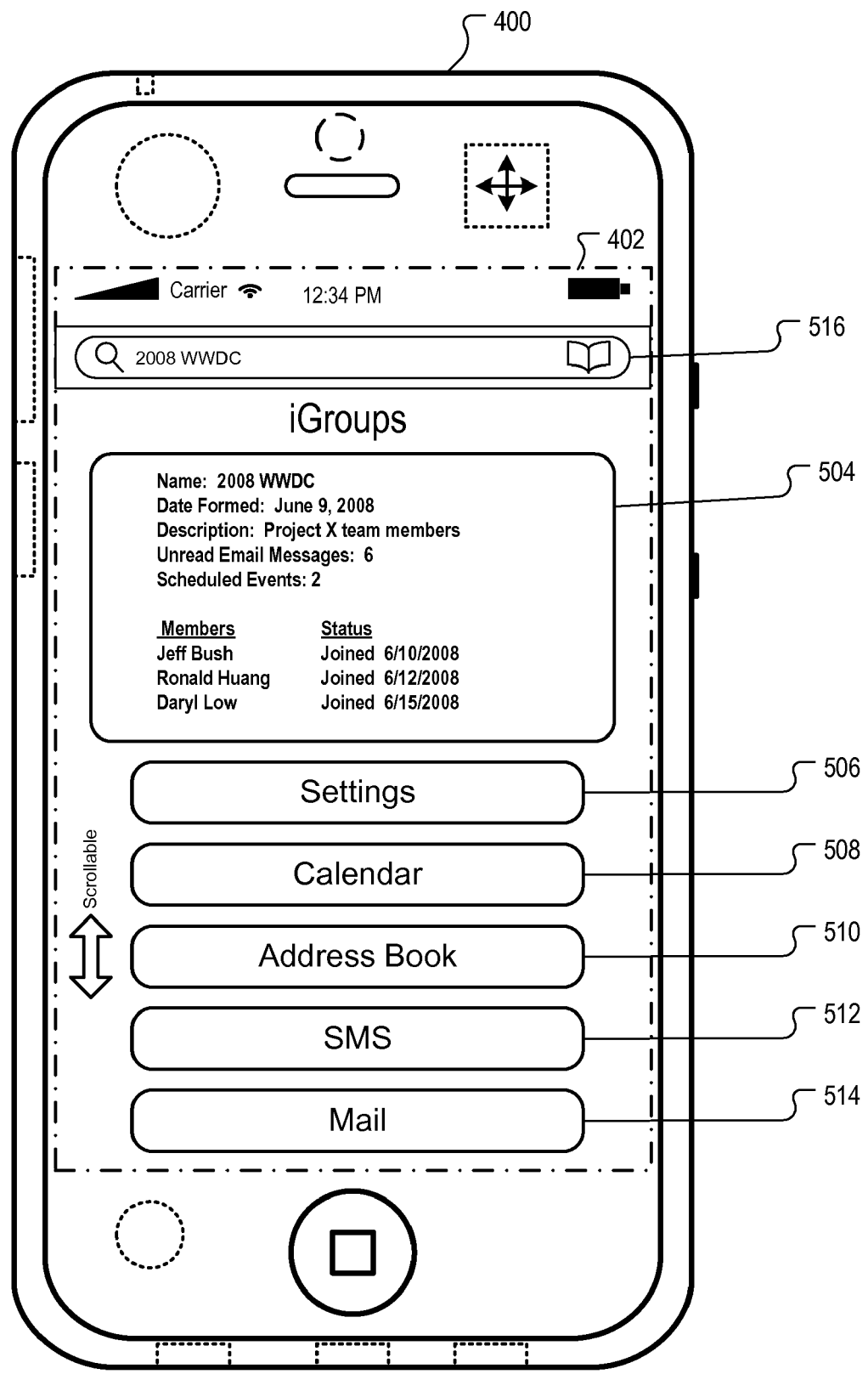
FIG. 5B illustrates an example user interface for allowing a user to manage their groups formed in accordance with the process of FIG. 2.

FIG. 5B illustrates an example user interface for allowing a user to manage groups formed in accordance with the process of FIG. 2. Continuing with the example of FIG. 5A, Daryl has now joined Group 2008 WWDC as indicated by his joined status. A profile 504 is displayed summarizing information about the Group, including the name, date formed, a description, a number of unread emails from Group members, a number of scheduled calendar events for the Group. Other information can be provided as desired.

In addition to the profile 504, several option buttons can be presented. A Settings option 506 can be used to enter a settings page to allow the user to set various parameters related to the Group, such as communication parameters related to calendars, contacts, SMS and mail services. A Calendar option 508 launches a calendar application or service which can provide a calendar populated with calendar events related to the Group and include tools for managing calendar events. An Address Book option 510 can be used to launch and address book application or service which can provide and address book that can be populated with contact information of Group members. An SMS option 512 can be used to launch an SMS application or service for sending instant messages to Group members, including broadcast messages to all members. A Mail option 514 launches a mail application or service for emailing members.

Other applications can be included as desired. The applications can be independent applications or services provided by a single applications. The applications can be executed by the mobile device 400 or provided by a network-based service (e.g., Web service). In some implementations, additional options can be viewed by applying a "flicking" gesture to the touch-sensitive display 402 with one or more fingers. The flicking gesture can cause the user interface to scroll up or down, revealing additional options. One additional option can be the option to delete a Group.

In some implementations, a search field 516 can be provided to allow users to search for Groups using search queries (e.g., using the tag 2008 WWDC). Thus, a user can store hundreds of Groups in a repository at the trusted service 104 or other network storage provider and search those Groups from their device. Users can also use bookmarks to categorize Groups (e.g., Favorite Groups).

In some implementations, tokens can be used to track the movements of a device. In such an embodiment, the tokens are like "cookie crumbs" that are left behind at different geographic locations. A trusted service can use the tokens to construct a map display with placemarks identifying geographic locations of contact events. The placemarks can be shared with other users.

Network Operating Environment

Figure 6:
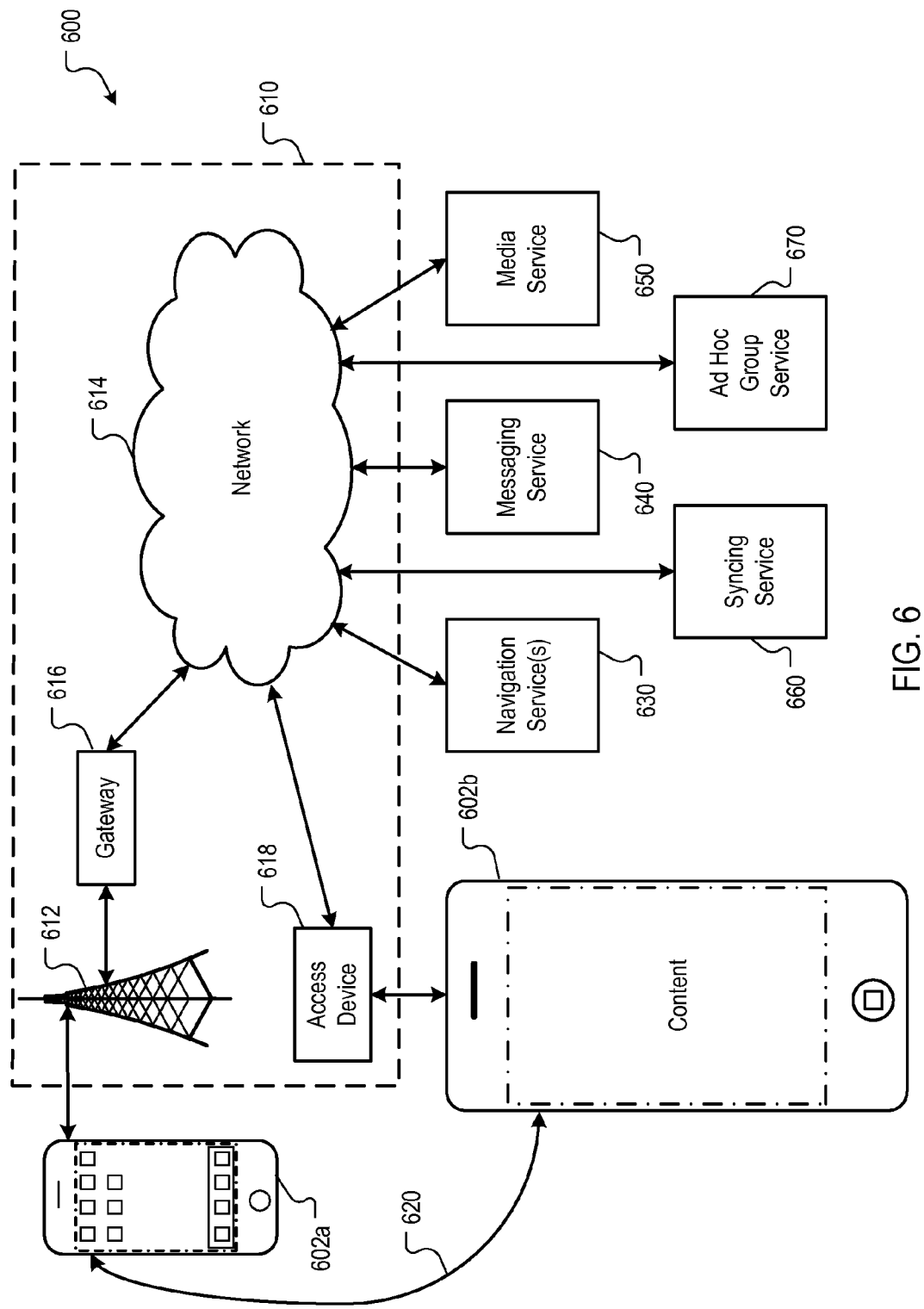
FIG. 6 is a block diagram of an example operating environment for the mobile device of FIG. 4.

FIG. 6 is a block diagram of an example network operating environment for the mobile device of FIG. 4. Mobile devices 602a and 602b can, for example, communicate over one or more wired and/or wireless networks 610 in data communication. For example, a wireless network 612, e.g., a cellular network, can communicate with a wide area network (WAN) 614, such as the Internet, by use of a gateway 616. Likewise, an access device 618, such as an 802.11g wireless access device, can provide communication access to the wide area network 614.

In some implementations, both voice and data communications can be established over the wireless network 612 and the access device 618. For example, the mobile device 602a can place and receive phone calls (e.g., using VoIP protocols), send and receive e-mail messages (e.g., using POP3 protocol), and retrieve electronic documents and/or streams, such as web pages, photographs, and videos, over the wireless network 612, gateway 616, and wide area network 614 (e.g., using TCP/IP or UDP protocols). Likewise, in some implementations, the mobile device 602b can place and receive phone calls, send and receive e-mail messages, and retrieve electronic documents over the access device 618 and the wide area network 614. In some implementations, the mobile device 602a or 602b can be physically connected to the access device 618 using one or more cables and the access device 618 can be a personal computer. In this configuration, the mobile device 602a or 602b can be referred to as a "tethered" device.

The mobile devices 602a and 602b can also establish communications by other means. For example, the wireless device 602a can communicate with other wireless devices, e.g., other mobile devices 602a or 602b, cell phones, etc., over the wireless network 612. Likewise, the mobile devices 602a and 602b can establish peer-to-peer communications 620, e.g., a personal area network, by use of one or more communication subsystems, such as the Bluetooth™ communication devices 112, 116 shown in FIG. 1. Other communication protocols and topologies can also be implemented.

The mobile device 602a or 602b can, for example, communicate with one or more services 630, 640, 650, 660, and 670 over the one or more wired and/or wireless networks. For example, one or more navigation services 630 can provide navigation information, e.g., map information, location information, route information, and other information, to the mobile device 602a or 602b. A user of the mobile device 602b can invoke a map functionality, e.g., by pressing a maps object on the top-level graphical user interface shown in FIG. 4, and can request and receive a map for a particular location, request and receive route directions, or request and receive listings of businesses in the vicinity of a particular location, for example.

A messaging service 640 can, for example, provide e-mail and/or other messaging services (e.g., SMS). A media service 650 can, for example, provide access to media files, such as song files, audio books, movie files, video clips, and other media data. In some implementations, separate audio and video services (not shown) can provide access to the respective types of media files. A syncing service 660 can, for example, perform syncing services (e.g., sync files). A Group formation service 670 can, for example, perform the processes described in reference to FIG. 2. Other services can also be provided, including a software update service that automatically determines whether software updates exist for software on the mobile device 602a or 602b, then downloads the software updates to the mobile device 602a or 602b where the software updates can be manually or automatically unpacked and/or installed.

The mobile device 602a or 602b can also access other data and content over the one or more wired and/or wireless networks. For example, content publishers, such as news sites, RSS feeds, web sites, blogs, social networking sites, developer networks, etc., can be accessed by the mobile device 602a or 602b. Such access can be provided by invocation of a web browsing function or application (e.g., a browser) in response to a user touching, for example, a Web object.

Example Mobile Device Architecture

Figure 7:
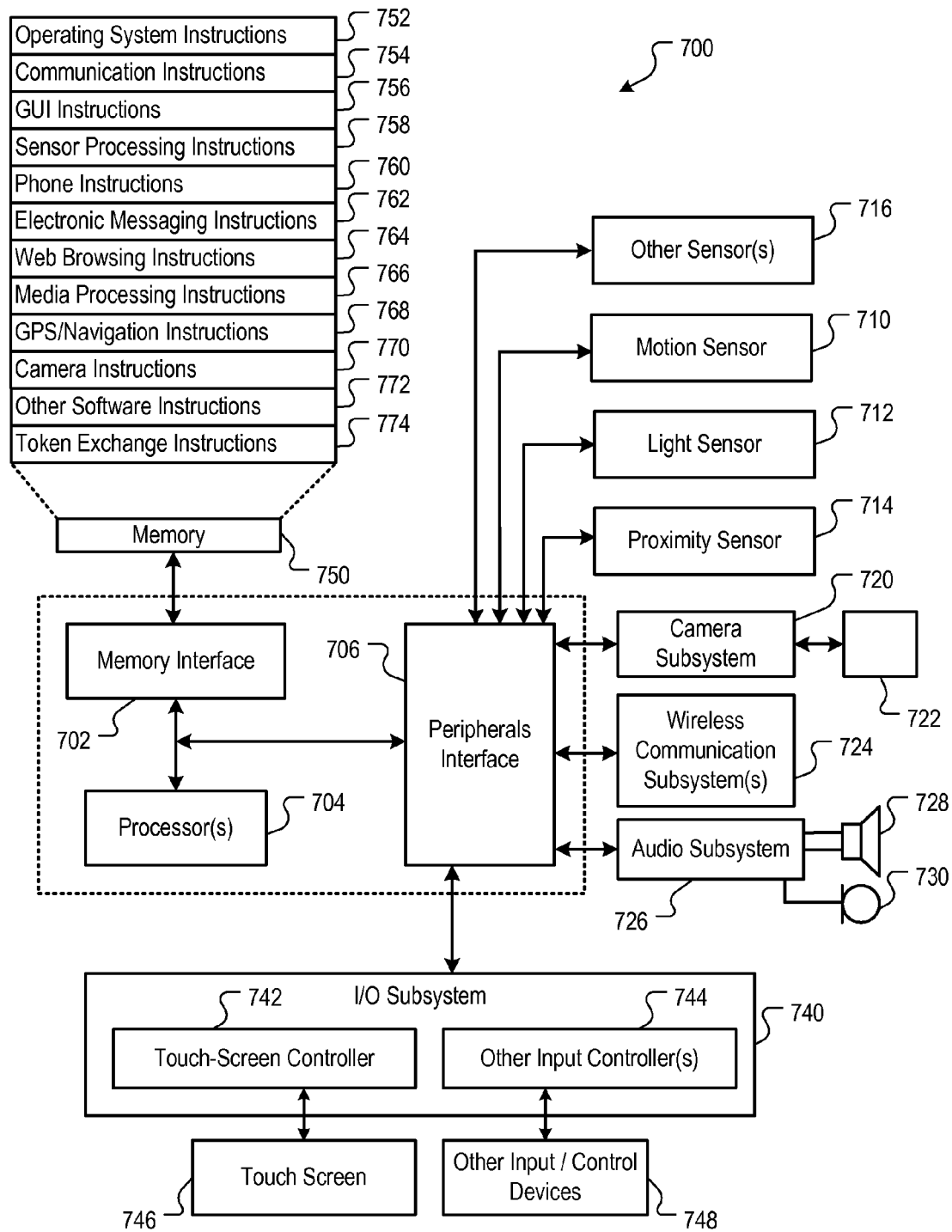
FIG. 7 is a block diagram of an example architecture for the mobile device of FIG. 4.

FIG. 7 is a block diagram of an example architecture for the mobile device of FIG. 4. The mobile device 400 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the mobile device 100 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate the orientation, lighting, and proximity functions described with respect to FIG. 4. Other sensors 716 can also be connected to the peripherals interface 706, such as a positioning system (e.g., GPS receiver), a temperature sensor, a biometric sensor, or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the mobile device 400 is intended to operate. For example, a mobile device 400 may include communication subsystems 724 designed to operate over a GSM network, a GPRS network, an EDGE network, a Wi-Fi or WiMax network, and a Bluetooth network. In particular, the wireless communication subsystems 724 may include hosting protocols such that the device 400 may be configured as a base station for other wireless devices.

An audio subsystem 726 can be coupled to a speaker 728 and a microphone 730 to facilitate voice-enabled functions, such as voice recognition, voice replication, digital recording, and telephony functions.

The I/O subsystem 740 can include a touch screen controller 742 and/or other input controller(s) 744. The touch-screen controller 742 can be coupled to a touch screen 746 or pad. The touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration may disengage a lock of the touch screen 746; and a pressing of the button for a second duration that is longer than the first duration may turn power to the mobile device 400 on or off. The user may be able to customize a functionality of one or more of the buttons. The touch screen 746 can, for example, also be used to implement virtual or soft buttons and/or a keyboard.

In some implementations, the mobile device 400 can present recorded audio and/or video files, such as MP3, AAC, and MPEG files. In some implementations, the mobile device 400 can include the functionality of an MP3 player, such as an iPod™. The mobile device 400 may, therefore, include a pin connector that is compatible with the iPod. Other input/output and control devices can also be used.

The memory interface 702 can be coupled to memory 750. The memory 750 can include high-speed random access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks. The operating system 752 may include instructions for handling basic system services and for performing hardware dependent tasks. In some implementations, the operating system 752 can be a kernel (e.g., UNIX kernel).

The memory 750 may also store communication instructions 754 to facilitate communicating with one or more additional devices, one or more computers and/or one or more servers. The memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; and/or other software instructions 772 to facilitate other processes and functions, e.g., security processes and functions. The memory 750 may also store other software instructions (not shown), such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. The token exchange instructions 774 can be used to implement the processes described in reference to FIGS. 3A and 3B.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the mobile device 400 may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:

receiving, at a trusted service, a first plurality of tokens and corresponding timestamps from a first device, where the first plurality of tokens do not identify a particular device or its user or owner and where the first plurality of tokens were received by the first device from a first plurality of devices;

receiving, at the trusted service, a second plurality of tokens and corresponding timestamps from a second device, where the second plurality of tokens do not identify a particular device or its user or owner and where the second plurality of tokens were received from a second plurality of devices;

comparing, at the trusted service, the first plurality of tokens and timestamps to the second plurality of tokens and timestamps;

based on the comparison, determining, at the trusted service, that the first device and the second device have collected one or more matching tokens at a time, or in a time frame, determined by the timestamps;

identifying, at the trusted service, users associated with the first device and the second device; and creating, at the trusted service, a group for the identified users.

2. The method of claim 1, further comprising:
determining a geographic location of the first and second devices; and
targeting users in the group with location based services based on the geographic location.

3. The method of claim 2, where targeting further comprises:
sending content to one or more users in the group.

4. The method of claim 1, where the tokens comprise cryptographic material.

5. The method of claim 1, where the tokens are periodically changed.

6. The method of claim 1, where the first and second devices include one or more of wireless devices and wired devices.

7. The method of claim 2, where the geographic location is provided by an access device or based on the location of an access device.

8. A method performed by a device, comprising:
receiving, at a first device, tokens from a number of devices, where the tokens do not identify a particular device or its user or owner;
generating, at the first device, a timestamp for each of the tokens corresponding to when the token was received;
sending, from the first device, the tokens and corresponding timestamps to a trusted service; and
receiving, from the trusted service, information describing a group of users associated with devices that received matching tokens having similar corresponding timestamps, where the trusted service compares tokens and timestamps received from a plurality of devices to generate the information describing the group of users.

9. The method of claim 8, further comprising:
receiving from the trusted service, an invitation to join the group of users;
receiving input accepting the invitation to join;
sending the input to the trusted service; and
receiving from the trusted service, information confirming that the user has joined the group.

10. The method of claim 8, further comprising:
sending location information to the trusted service; and
receiving a location-based service or content based on the location information.

11. The method of claim 8, further comprising:
broadcasting cryptographic tokens.

12. The method of claim 11, where the cryptographic tokens are periodically changed.

13. A non-transitory computer-readable medium having instructions stored thereon, which, when executed by a processor, causes the processor to perform operations comprising:

receiving, at a trusted service, a first plurality of tokens and corresponding timestamps from a first device, where the first plurality of tokens do not identify a particular device or its user or owner and where the first plurality of tokens were received by the first device from a first plurality of devices;

receiving, at the trusted service, a second plurality of tokens and corresponding timestamps from a second device, where the second plurality of tokens do not identify a particular device or its user or owner and where the second plurality of tokens were received from a second plurality of devices;

comparing, at the trusted service, the first plurality of tokens and timestamps to the second plurality of tokens and timestamps;

based on the comparison, determining, at the trusted service, that the first device and the second device have collected one or more matching tokens at a time, or in a time frame, determined by the timestamps;

identifying, at the trusted service, users associated with the first device and the second device; and creating, at the trusted service, a group for the identified users.

14. The non-transitory computer-readable medium of claim 13, further comprising:
determining a geographic location of the first and second devices; and
targeting users in the group with location based services based on the geographic location.

15. The non-transitory computer-readable medium of claim 14, where targeting further comprises:
sending content to one or more users in the group.

16. The non-transitory computer-readable medium of claim 13, where the tokens comprise cryptographic material.

17. The non-transitory computer-readable medium of claim 13, where the tokens are periodically changed.

18. The non-transitory computer-readable medium of claim 14, where the geographic location is provided by an access device or based on the location of an access device.

19. A non-transitory computer-readable medium having instructions stored thereon, which, when executed by a processor, causes the processor to perform operations comprising:
receiving, at a first device, tokens from a number of devices, where the tokens do not identify a particular device or its user or owner;
sending, from the first device, the tokens and corresponding timestamps to a trusted service; and
receiving, from the trusted service, information describing a group of users associated with devices that received matching tokens having similar corresponding timestamps, where the trusted service compares tokens and timestamps received from a plurality of devices to generate the information describing the group of users.

20. The non-transitory computer-readable medium of claim 19, further comprising:
receiving from the trusted service, an invitation to join the group of users;
receiving input accepting the invitation to join;
sending the input to the trusted service; and
receiving from the trusted service, information confirming that the user has joined the group.

21. The non-transitory computer-readable medium method of claim 19, further comprising:
   sending location information to the trusted service; and
   receiving a location-based service or content based on the location information.

22. The non-transitory computer-readable medium method of claim 19, further comprising:
   broadcasting cryptographic tokens.

23. The non-transitory computer-readable medium of claim 22, where the cryptographic tokens are periodically changed.

* * * * *

UNITED STATES PATENT AND TRADEMARK OFFICE
CERTIFICATE OF CORRECTION

PATENT NO. : 8,359,643 B2
APPLICATION NO. : 12/233358
DATED : January 22, 2013
INVENTOR(S) : Daryl Mun-Kid Low et al.

It is certified that error appears in the above-identified patent and that said Letters Patent is hereby corrected as shown below:

Col. 19, line 1, in claim 21, after "medium" delete "method".

Col. 19, line 6, in claim 22, after "medium" delete "method".

Signed and Sealed this
Second Day of April, 2013

Teresa Stanek Rea
*Acting Director of the United States Patent and Trademark Office*